(12) United States Patent
Mall et al.

(10) Patent No.: US 7,716,817 B2
(45) Date of Patent: May 18, 2010

(54) INDEXING APPARATUS AND METHOD FOR INSTALLATION OF STATOR BARS

(75) Inventors: Waheed Tony Mall, Halfmoon, NY (US); James T. Henley, Saratoga Springs, NY (US); Craig A. Wroblewski, Schenectady, NY (US); Mark Clough, Strasburg, OH (US); Leonid Lombersky, Schenectady, NY (US); John G. Rizzo, Johnstown, NY (US)

(73) Assignee: General Electric Company, Schenectady, NY (US)

( * ) Notice: Subject to any disclaimer, the term of this patent is extended or adjusted under 35 U.S.C. 154(b) by 223 days.

(21) Appl. No.: 11/881,604

(22) Filed: Jul. 27, 2007

(65) Prior Publication Data

US 2009/0026852 A1 Jan. 29, 2009

(51) Int. Cl.
*H02K 15/00* (2006.01)

(52) U.S. Cl. .............................. 29/732; 29/596; 29/609; 29/598; 29/734; 310/91; 140/92.1; 140/92.2; 212/180

(58) Field of Classification Search .................. 29/596, 29/736, 732, 598, 609, 734; 320/214, 217; 212/180; 310/42, 91, 217, 258, 259; 140/92.1, 140/92.2
See application file for complete search history.

(56) References Cited

U.S. PATENT DOCUMENTS

| | | | | |
|---|---|---|---|---|
| 3,793,694 A | * | 2/1974 | Norkaitis | 29/732 |
| 3,985,163 A | * | 10/1976 | Vogel et al. | 140/92.1 |
| 4,237,398 A | | 12/1980 | Chigirinsky et al. | |
| 4,276,689 A | * | 7/1981 | Urick et al. | 29/596 |
| 5,911,453 A | * | 6/1999 | Boyd et al. | 29/596 |
| 6,389,679 B1 | * | 5/2002 | Kliman et al. | 29/596 |
| 7,353,586 B2 | * | 4/2008 | Majernik et al. | 29/596 |
| 2003/0217455 A1 | * | 11/2003 | Oliver et al. | 29/596 |
| 2006/0169822 A1 | * | 8/2006 | Noji | 242/432.2 |
| 2008/0256783 A1 | * | 10/2008 | Alfermann et al. | 29/596 |
| 2009/0134742 A1 | * | 5/2009 | Rhode | 310/218 |

FOREIGN PATENT DOCUMENTS

| | | |
|---|---|---|
| CA | 2264384 | 9/1999 |
| EP | 1107428 A2 | 6/2001 |
| EP | 1107428 A3 | 11/2005 |

* cited by examiner

*Primary Examiner*—Derris H Banks
*Assistant Examiner*—Jeffrey Carley
(74) *Attorney, Agent, or Firm*—Edward J. Smith; Ernest G. Cusick; Frank A. Landgraff

(57) ABSTRACT

A stator bar installation fixture and method for installing stator bars into specific stator core slots within a stator core of rotating electrical equipment. The stator bar installation fixture includes rotating mechanisms, rotatingly fixed at each end of the rotating electrical equipment, for supporting and controlling an angular positioning of a stator bar insertion mechanism relative to the stator core. The stator bar insertion mechanism supports a stator bar within the stator core, angularly locates a stator bar in alignment with the specific stator core slot, and inserts the stator bar into the specific stator core slot.

13 Claims, 21 Drawing Sheets

INDEXING APPARATUS AND METHOD FOR INSTALLATION OF STATOR BARS

BACKGROUND OF THE INVENTION

The invention relates generally to equipment and methods for installing and removing stator bars to and from stator core slots in rotating electrical equipment for initial installation, maintenance and repair.

Certain rotating electrical equipment, for example a power generator, has stator bars. Stator bars comprise large electrical conductors that are capable of carrying large amounts of electrical power within the electrical equipment. Stator bars are assembled in the stator core slots and joined at the ends to form coils and connected in the proper phase belts by bus rings. Stator bars must be installed during initial assembly of the electrical devices or may need to be removed and replaced due to damage or maintenance to the stator bar or to other internal components of the electrical devices. In order to access the stator bars, the rotor must be removed to expose the space within the inner periphery of the stator core.

If the stator bar is removed for repair or replacement, it is manually carried from its slot in the stator core to a repair area and carried back to the core when the repair or replacement is completed. When initially installed or replaced, the heavy and unwieldy stator bar must be transported from a staging area for insertion into a slot within the stator core. Once the bar is inside the core, it is manually lifted and lowered to a correct slot and then inserted and wedged. Manually moving the unwieldy and heavy bars requires manpower and time and involves a safety hazard. The methods employed today require between 4 and 8 worker crew to lift and carry the bars, makeshift equipment for movement and positioning, and physically intensive manual positioning and supporting the stator bars within the stator core. Manual lifting of heavy stator bars into specific slots around the full inner radius of the stator core is an awkward operation, exposing the workers to possible injury. Current practice employs manual labor with a makeshift assortment of equipment to position and support the bars within the slots until the bar can be retained in place.

Further, errors when manual positioning of the heavy stator bars can result in dropping or unintended contact between the stator bars and the core resulting in damage to the stator bar or the core Additionally, the stator core is a cramped space. Existing support equipment to assist in positioning and insertion of the stator bars must be set up to service slots in specific quadrants of the stator core and then taken down and reassembled to service the different quadrants of the stator core.

Accordingly, there is a need to provide an apparatus for and to improve the method of transporting and manipulating a stator bar to position it to a correct slot so that the stator bar can be inserted and wedged into position. There is also a need for a device that can be assembled once and which will provide for inserting stator bars around the full 360 degree inner surface of the stator core.

BRIEF DESCRIPTION OF THE INVENTION

The present invention relates to an apparatus and method for improving the transportation and manipulation of a stator bar particularly during a liquid cooled stator rewind procedure.

Briefly in accordance with one aspect of the invention, a stator bar installation fixture is provided for installing stator bars into specific stator core slots within the stator core of rotating electrical equipment. The stator bar installation fixture includes rotating mechanisms that are rotatingly fixed at each end of the rotating electrical equipment for supporting and controlling angular positioning of a stator bar insertion mechanism relative to the stator core. The stator bar insertion mechanism provides support for the stator bar within the stator core space, angularly locating the stator in alignment with the specific stator core slot, and inserting the stator bar into the specific stator core slot.

Briefly, in accordance with another aspect of the present invention, a method is provided for inserting a stator bar into a specific stator core slot. The method includes installing a rotating mechanism at each end of the rotating electrical equipment, installing a stator bar insertion mechanism between and fixed to each rotating mechanism, and then mounting a stator bar to the stator bar insertion mechanism. The method further includes rotating the rotating mechanism so the stator bar insertion mechanism aligns the mounted stator bar to the opening of the specific stator core slot to which the stator bar is to be inserted and then inserting the stator bar into the specific stator core slot. The stator bar is then locked in place.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including quickly, efficiently and safely indexing stator bars to specific stator core slots of rotating electrical machinery.

Figure 1:
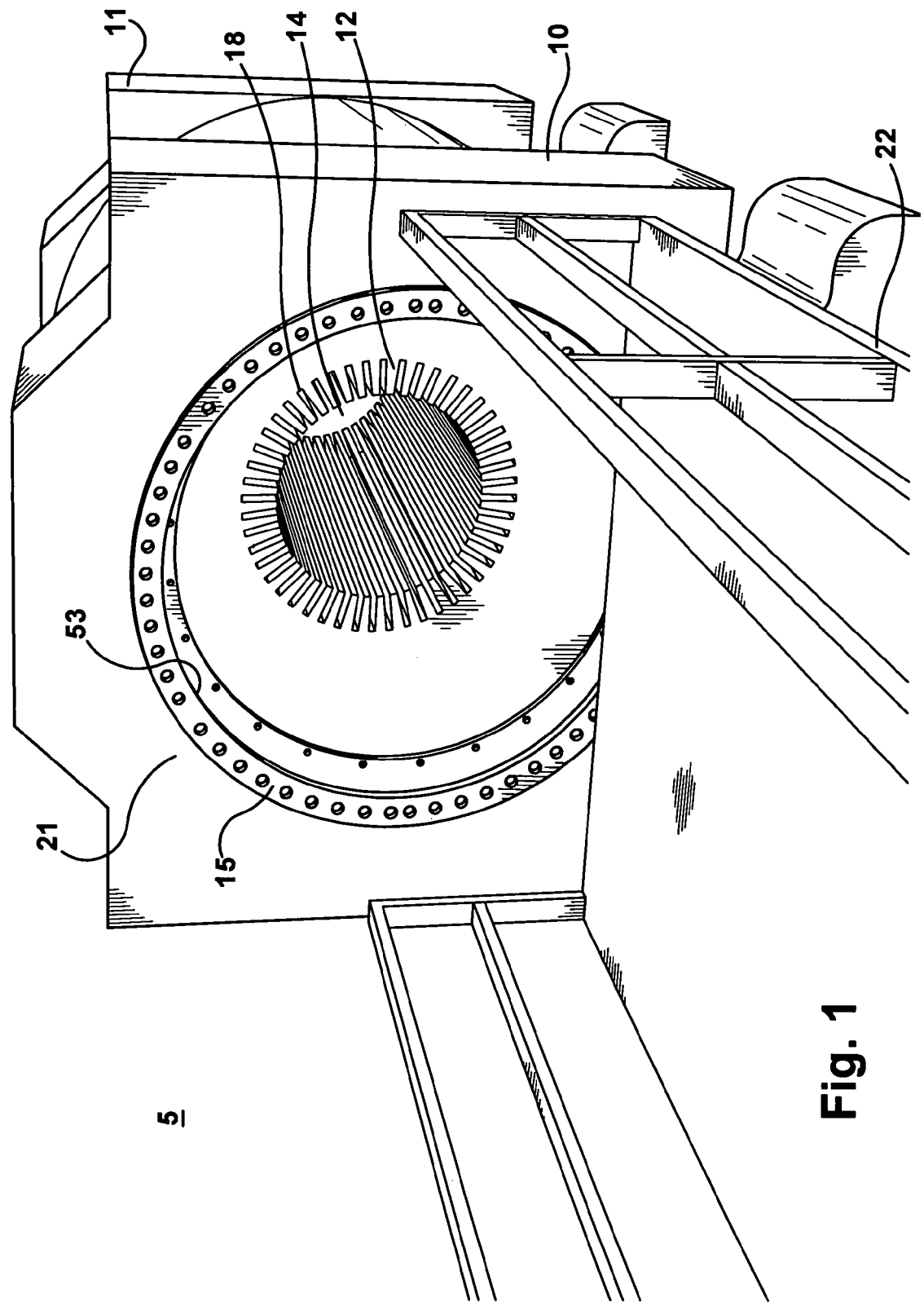
FIG. 1 illustrates an isometric view of an electrical generator frame with end covers and rotor removed.

FIG. 1 illustrates an isometric view of rotating electrical equipment 5 in the form of electrical generator. Specifically shown is a conventionally cooled electrical generator, although the present invention is not restricted to electrical generators. The electrical generator is shown with the end covers and the rotor not in place, as in a condition for initial installation or for maintenance. Thereby exposed are the collector end housing 10 at the near end of the electrical generating equipment, the stator core space 14 through to the turbine end housing 11, and an end bolting surface 15 for the mounting end cover (not shown). The stator core space 14 is unoccupied at this time as the rotor is removed, exposing the stator core 12, with a plurality of stator core slots 18 located circumferentially for mounting stator bars (not shown), which carry the electrical current generated by the equipment. An end flange 21 is provided at each end of the electrical generator. Further shown in the near ground is a turbine repair deck 22 for providing access to the inside of the equipment and transporting stator bars and other parts needed for maintenance on the equipment. Alternatively, an adapter track may be attached to each of the generator end flanges 21, to establish a track with a consistent bolting pattern to which the rotating rings may be mounted (such as in FIG. 13).

A stator bar installation fixture includes a rotating mechanism provided at each end housing of the electrical generating equipment and a stator bar insertion mechanism, supported between each of the rotating mechanisms. The stator bar installation fixture is adaptable for receiving a stator bar placed inside the stator core space and inserting the bar into the stator core. The stator bar installation fixture accepts the stator bar placed within the stator core space and is capable of inserting the bar into any specific slot around the full periphery of the stator core. Stator bar lengths from about 190 to about 300-inch may be handled. Stator bar widths from about 0.80 to about 1.20-inch may be handled. Stator bar weights of up to about 150 to about 400 pounds may be handled. The stator bar installation fixture is capable of operation with stator frame lengths of about 240 to about 375-inch, stator frame end diameters from about 95 to about 120-inch, stator frame core diameters from about 36 to about 65-inch, and a plurality of stator frame slots ranging from about 54 to about 72. Varying lengths of the stator bar and stator frame length may be adapted to by sizing of the length of the supporting elements within the stator bar insertion mechanism. Varying stator end frame diameters and stator core diameters may be adapted to by sizing radial supports of the stator bar insertion mechanism. However, it should be understood that the present invention may be adapted by further scaling to rotating electrical equipment of larger or smaller sizes.

Each rotating mechanism is rotatably fixed at each end of the electrical generating equipment. Each rotating mechanism may be generally ring-shaped with an inner annulus that permits access for a stator bar insertion mechanism to the space within the stator core. The inner diameter of the rotating mechanism may be sized to permit access over a range of stator core diameters. The rotating mechanism provides support for and controls an angular positioning of the stator bar insertion mechanism with respect to the stator core. The stator bar insertion mechanism supports the stator bar within the stator core space, as the stator bar is being held and positioned for insertion into the stator core slot. The stator bar insertion mechanism holds the stator bar in a radial orientation while the rotating mechanism is rotated to an angle that places the bottom of the supported stator bar into alignment with a specific stator core slot. The rotating mechanism may include a braking mechanism to prevent unwanted rotation of the rotating mechanism and stator bar insertion mechanism once the stator bar is aligned with the specific stator core slot into which it is to be inserted. An actuating means may be provided for controlling the position of the stator bar on the stator insertion mechanism and for inserting the stator bar into the specific stator core slot and removing the stator bar from the specific stator core slot.

The stator bar insertion mechanism includes a guide plate, fixed on its ends between each of the rotating mechanisms and rotating in synchronism with the rotating mechanism. The guide plate is aligned lengthwise along the axial direction of the stator core. A support means is provided for attaching the guide plate to the rotating mechanism. The support means aligns the guide plate such that the when a stator bar is held by the stator bar insertion mechanism, the stator bar will be radially oriented. When the stator bar is angularly aligned with the entrance to a specific stator core slot, radial retraction by a control arm of the actuating means will insert the stator bar into the specific stator core slot. The support means may be adjustable to accommodate different stator core sizes by radial positioning of the stator bar insertion mechanism in proximity to the inner periphery of the stator core. Differing stator core diameters are also accommodated by sizing the range of the stroke of a control arm of an actuating device that causes the stator bar to be inserted into or retracted from the stator core slot. Further, different core sizes may be accommodated by telescoping arms among and between elements of the rotating rings that may establish different radial dimensions for the rotating rings.

The support means may include support plates protruding radially inward from the rotating rings at each end of the rotating mechanism. The support plates provide attachment for the stator bar insertion mechanism to the rotating mechanism. The support plate may be configured with standard attachment means, including but not limited bolting, to the guide plate of the stator bar insertion mechanism. When a stator bar is held by the stator bar insertion mechanism, the stator bar will be radially oriented such that extension from stator bar insertion mechanism moves the stator bar in an outward radial direction with respect to the stator core. The support plates of varying depths of radial protrusion may be provided to allow the stator bar insertion mechanism to be attached at varying radial positions, thereby accommodating stator cores of different radial size.

The guide plate supports the remainder of the stator bar insertion mechanism, including a translating mechanism and the weight of the stator bar. The guide plate may be constructed using lightweight, but strong materials, such that the stator bar can be supported without distortion or bending. Additional support for the weight of the translating mechanism and stator bar may be provided by a support truss or other support means.

The translating mechanism may be a plate, slidingly attached in parallel with the guide plate. The guide plate may be preferably beam-shaped. The stator bar insertion mechanism may further include guide mechanisms to provide for smooth translating movement of the translating mechanism parallel to the guide plate under the weight of the stator bar. A spring-loaded clamp may further be provided to maintain the translating mechanism and stator bar laterally in alignment with the guide plate.

The stator bars may be attached to and held by the translating mechanism at multiple points along the length of the stator bar using plastic ties or other strapping material that will not score or damage the stator bar.

In one aspect of the stator bar installation fixture, each rotating mechanism includes two rotating rings at each end of the electrical generator. An inner rotating ring is located on the stator core side of the end flange and the outer rotating ring is located outside the end flange. The rotating rings are slightly larger than the inner diameter of the end flange. The rotating rings for each rotating mechanism are separated from each other by roller units, which join the rotating rings together in parallel, and support the rotating rings on an inner surface of the end housing. The inner surface of the end housing may include the inner annular diameter of the end flange. The roller units allow the rotating mechanism to rotate about the center of the rings, which are coincident with the center axis of the stator core space vacated by the rotor within stator core. The rotating rings are annular-shaped structures whose inner diameter is sufficiently large to accommodate access to the stator core volume for the stator bar insertion mechanism. The rotating rings may be arranged in segments to facilitate lifting and installation.

The actuating mechanisms for inserting and removing the stator bar to and from a stator core slot may each be located at one end of the stator core, and attached between the translating mechanism and the rotating ring. The actuating mechanism may include pneumatic, hydraulic and electric actuators. In one aspect of the mechanism, a control arm of the actuating mechanism may pull the translating mechanism outward to the outer periphery of the stator core volume, thereby bringing the end of the stator bar into proximity with the opening of the specific stator core slot and further inserting the stator bar into the specific stator core slot. Extension of the actuating mechanism may push the translating mechanism inward from the outer periphery of the stator core volume, thereby retracting the stator bar from the specific stator core slot.

Figure 2:
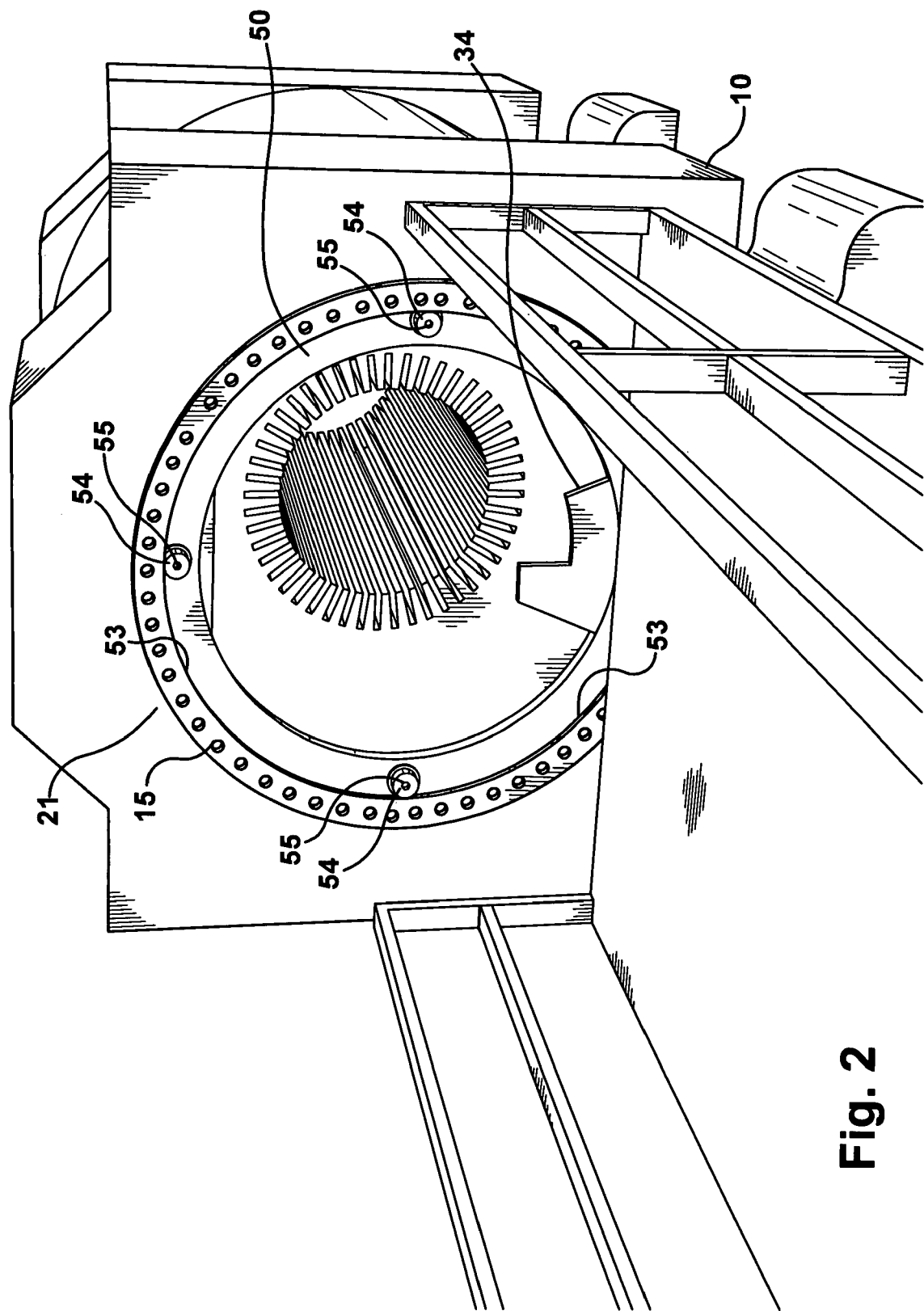
FIG. 2 illustrates an aspect of the present invention that includes a rotating mechanism with an inner rotating ring installed.

FIG. 2 illustrates an aspect of the present invention that includes a rotating mechanism with two rotating rings, as described above. An identical rotating mechanism is provided at the turbine end of the electrical generator (not shown). FIG. 2 illustrates the exposed collector end housing 10 of the electrical generator with an inner rotating ring 50 installed. The inner rotating ring has been installed on the inboard side of the end flange 21. A plurality of roller units 54 are rotatingly attached to the inner rotating ring 50 and ride on the inner circular surface 53 of the end flange 21. The roller units 54 rotate on axles 55 and support the weight of the inner rotating ring 50. Also shown is the support plate 34 fixed to the inner rotating ring 50. The number and distribution around the rotating rings of roller units 54 may be varied to address the size and weight of the particular application.

Figure 3:
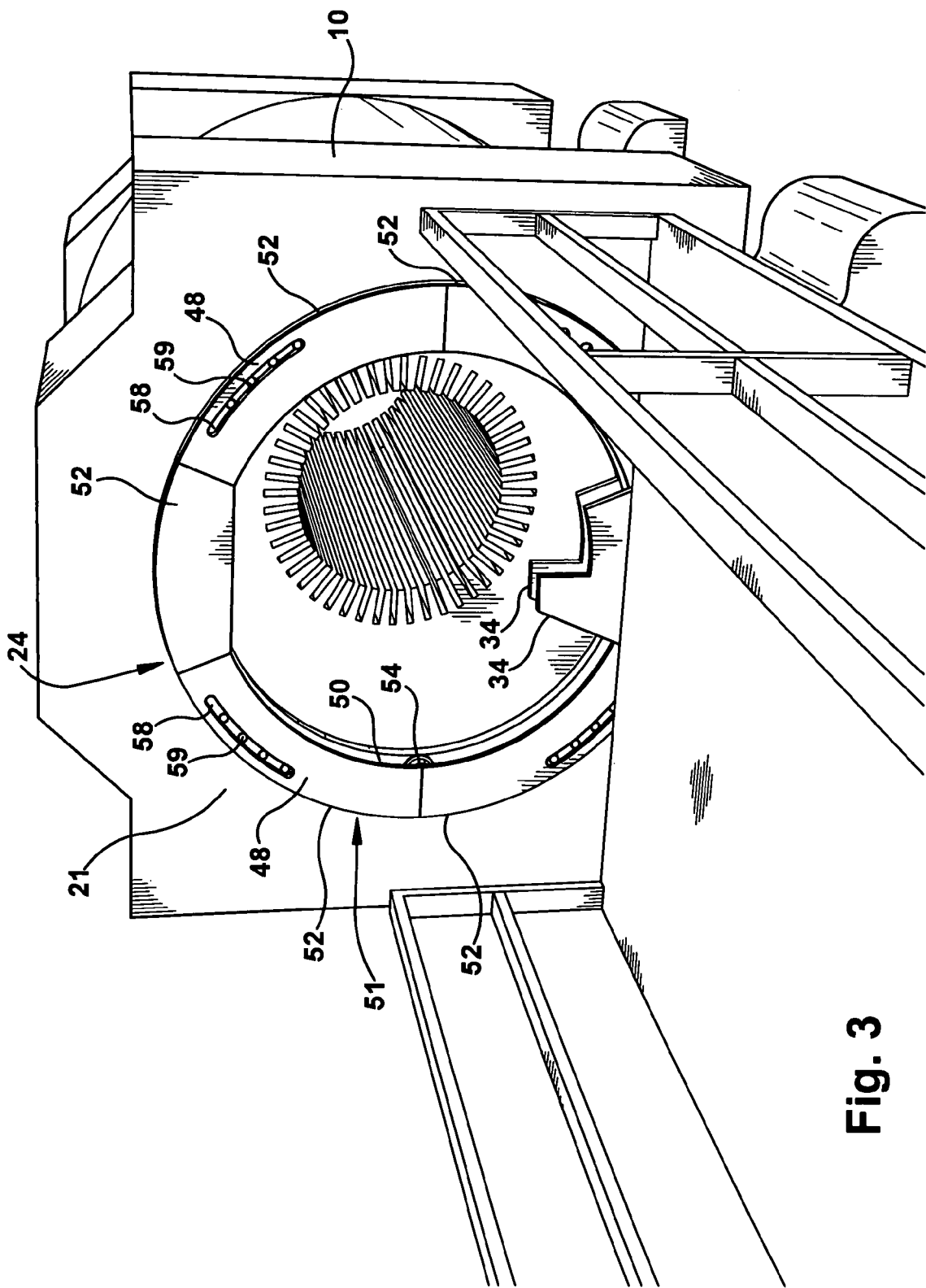
FIG. 3 illustrates an aspect of the exposed collector end of the electrical generator with the entire rotating mechanism for the collector end in place.

FIG. 3 illustrates the exposed collector end of the electrical generator with the rotating mechanism 24 for the collector end in place. The outer rotating ring 51 is positioned outboard of the end flange 21. The outer rotating ring 51 is also rotatingly attached to the roller units 54. The roller units 54 space the outer rotating ring 51 apart from the end flange 21 (FIG. 2). The roller units 54 also space the inner rotating ring 50 apart from end flange 21 (FIG. 2) and space the inner rotating ring 50 from the outer rotating ring 51. The outer rotating ring (51) is also provided with a support plate 34. In FIG. 3, the outer rotating ring 51 is further shown comprising a plurality of rotating ring segments 52. The inner rotating ring 50 also comprises an equal plurality of rotating ring segments 52. The rotating rings segments 52 are connected together by standard means, including but not limited to bolting, to create the unitary inner rotating ring 50 and the unitary outer rotating ring 51. Segmentation of the inner and outer rotating rings makes each individual rotating ring segment 52 lighter and smaller than the whole ring and therefore easier to install and remove. Further, because the outer diameter of the inner rotating ring 50 must be larger than the inner circular surface 53 of the end flange 21 to permit the roller units 54 (FIG. 2) to ride on the inner circular surface 53 (FIG. 2), the inner rotating ring 50 must be segmented to install in parts smaller than the inner circular surface 53 of the end flange 21.

The outer rotating ring 51 further includes a braking mechanism 56 (FIG. 8) to permit the rotating mechanism 24 to be locked at any angular position. The braking mechanism 56 (FIG. 8) may be incorporated into the outer rotating ring 52 by providing cutouts 58) in a circumferential path that lies above the bolting pattern of the bolting surface 15 (FIG. 2) of end flange 21. The individual cutouts 58 are sized such that each provides access to a plurality of existing bolt holes 59 in the end flange 21. The cutouts 58 may be provided in a plurality of segments of the rotating ring. Bolts 60 (FIG. 8) are sized to fit the existing bolt holes 59 in the end flange 21, normally used to secure the generator end covers in place under normal operating conditions. Tightening the bolts 60 down on the outer surface 48 of the outer rotating ring 51 around the cutouts 58 can secure the rotating mechanism 24 at any angular position, and are used to hold the stator bar insertion mechanism 26 in place while inserting the stator bar into a stator core slot.

Figure 4:
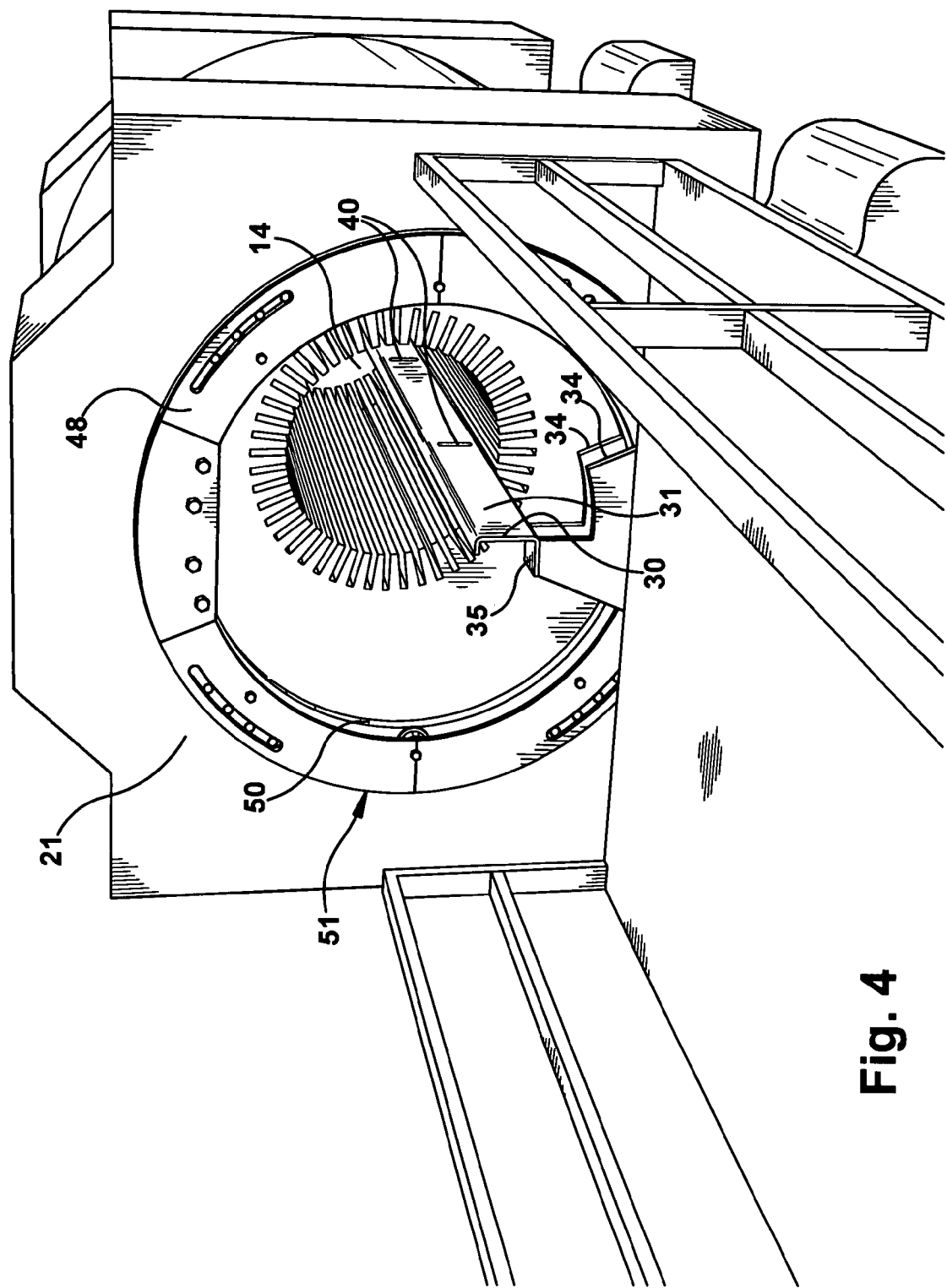
FIG. 4 illustrates the stator bar insertion mechanism attached to the support plate of the rotating mechanism, according to an aspect of the present invention.
Figure 10A:
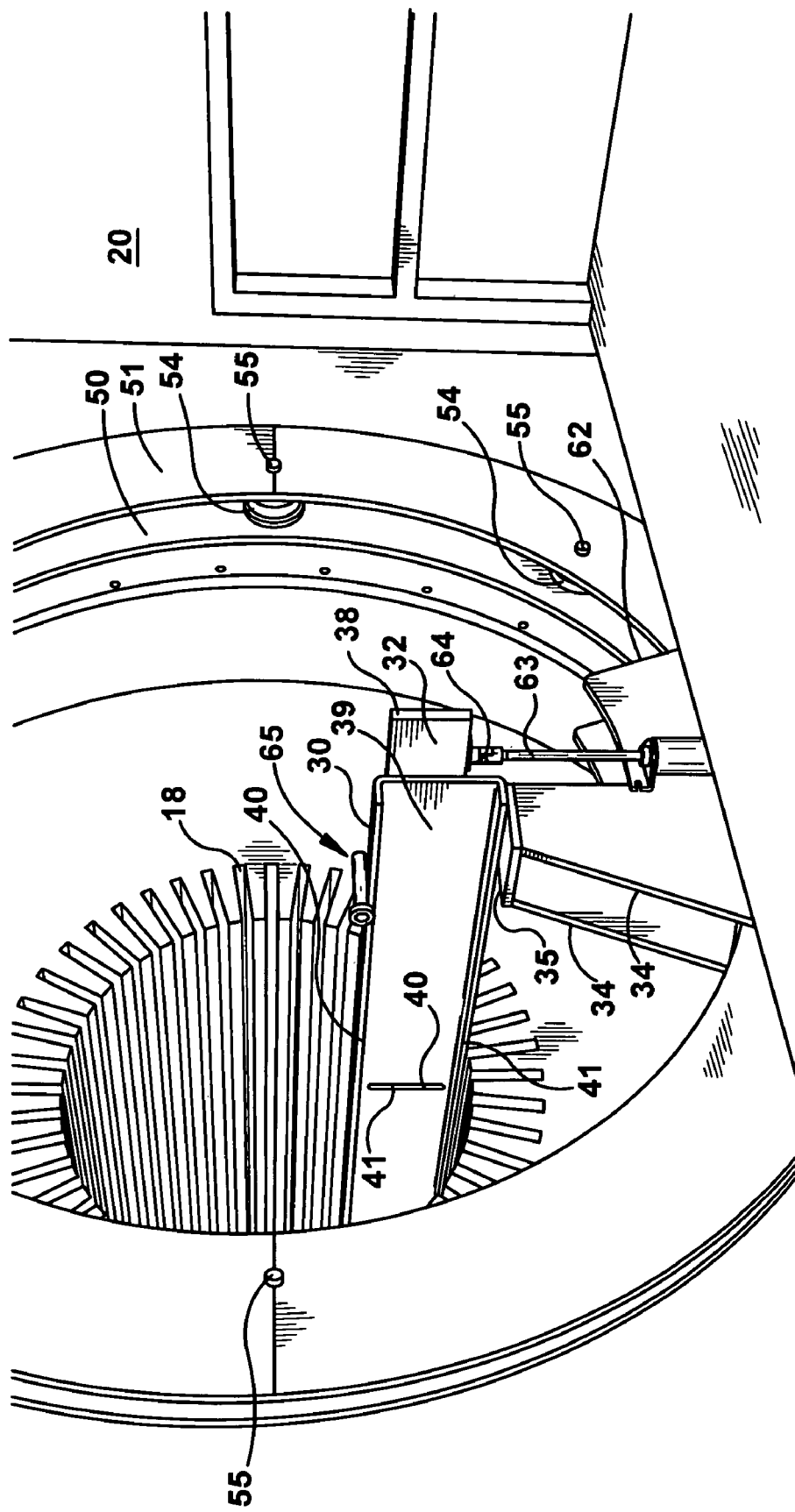
FIGS. 10A and 10B show an expanded view of the stator bar installation fixture at the collector end of the generator frame, according to an aspect of the present invention.
Figure 10B:
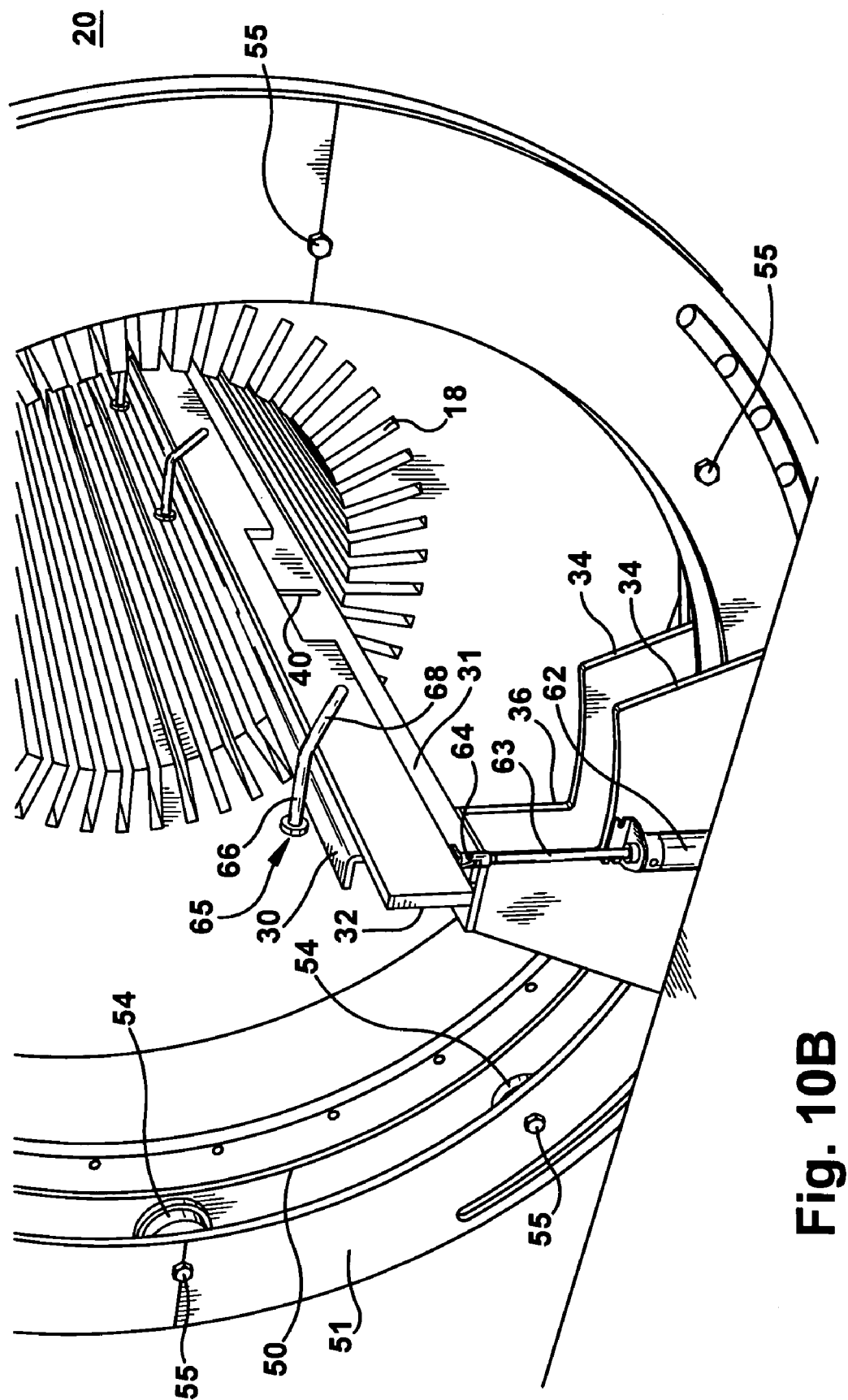

FIG. 4 illustrates the mounting of the stator bar insertion mechanism guide plate 30 onto the support plates 34. The rotating mechanisms 24 are rotated so the support plates 34 are positioned at the bottom of the stator core space 14. A support plate seat 35 is mounted between the support plates 34. The guide plate 30 of the stator bar insertion mechanism 26 is attached to the support plate 34 by bolting or other means known in the art. A plurality of vertical cutouts 40 are provided along the length of the guide plate 30 for accepting guide pins from translating mechanism 38. The translating mechanism 38 will be slidingly attached to the guide plate 30, as illustrated in FIGS. 10A and 10B.

Figure 5:
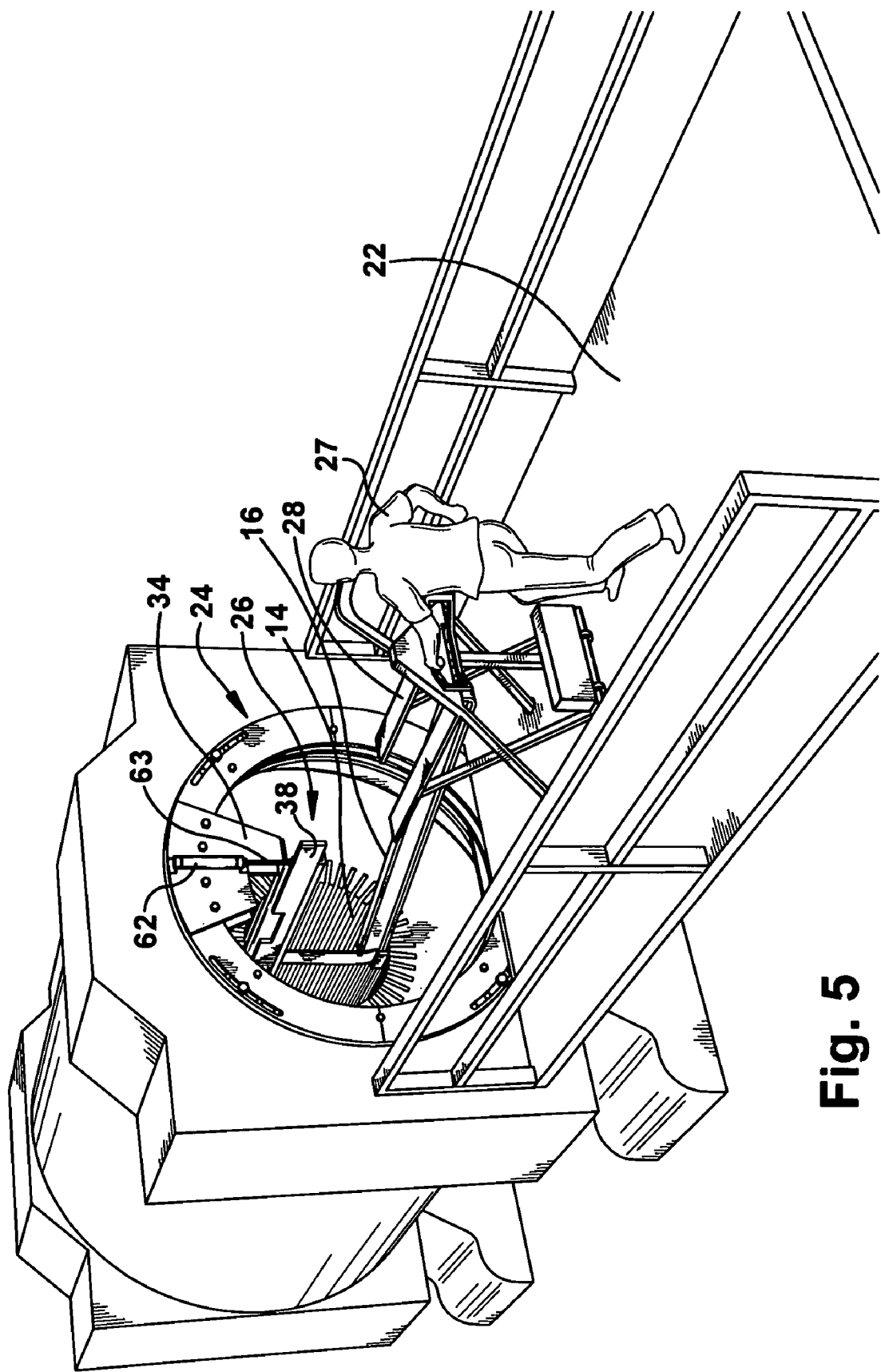
FIG. 5 illustrates manually inserting the stator bar into the stator core space, according to an aspect of the present invention.

FIG. 5 illustrates placing the stator bar 16 into the stator core space 14. The rotating mechanism 24 is rotated to locate the support plate 34 and the stator bar insertion mechanism 26 away from the bottom of the stator core space 14 in order to provide space for placing the stator bar 16 into the stator core space 14. The stator bar 16 is manually layed out in an axial direction along the bottom of the stator core space 14, using any of many possible manual means. The operator 27 is shown using a lift pallet 28 to place the stator bar 16 into the stator core space 14 from the turbine repair deck 22.

Figure 6:
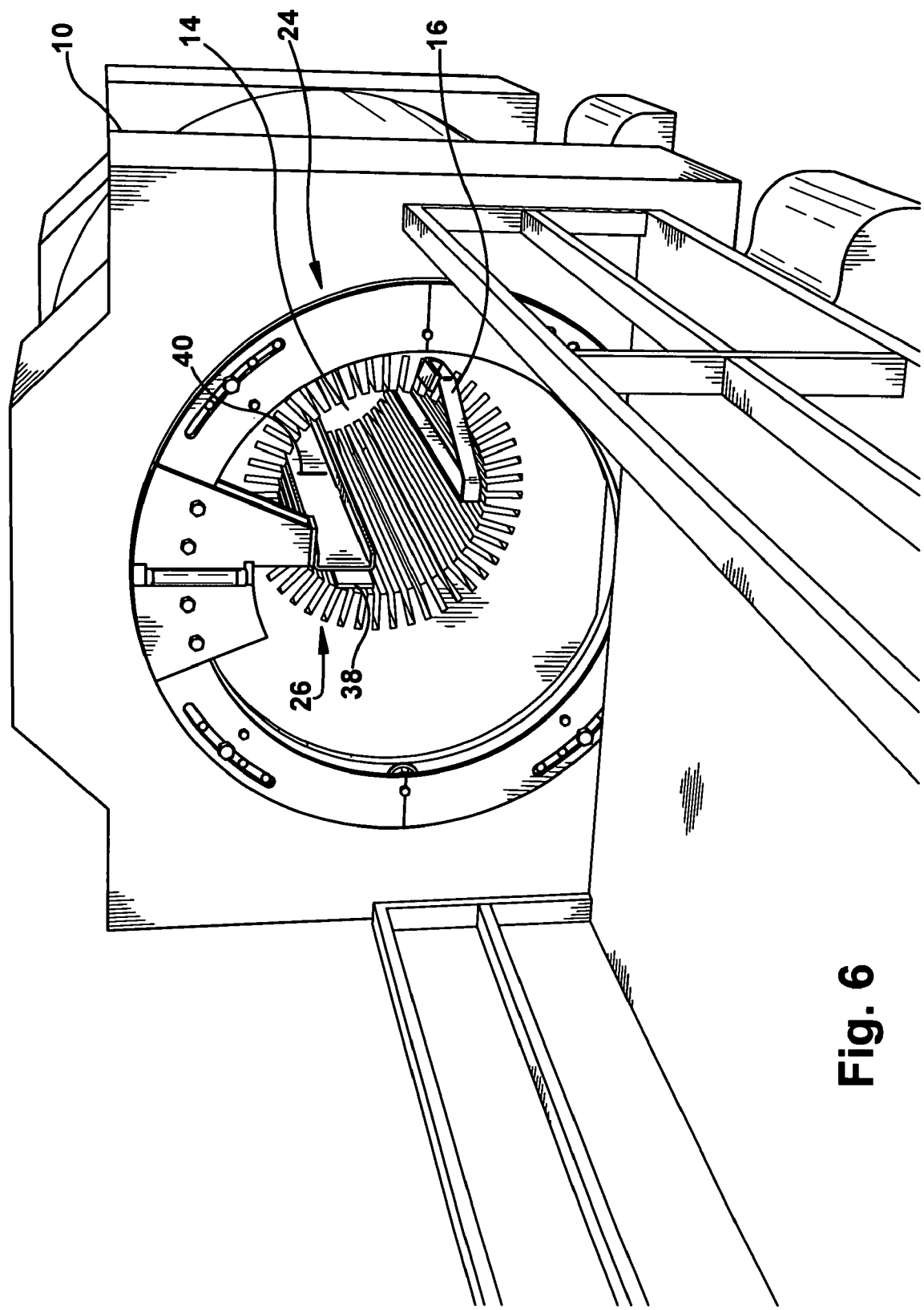
FIG. 6 illustrates the stator bar resting at the bottom of the stator core space in preparation for attachment to the stator bar insertion mechanism, according to an aspect of the present invention.

FIG. 6 illustrates the stator bar 16 resting at the bottom of the stator core space 14 in preparation for attachment to the stator bar insertion mechanism.

The rotating mechanism 24 is then rotated to locate the stator bar insertion mechanism 26 at the bottom of the stator core space 14. The stator bar 16 is then manually attached at the outer radial side of the translating mechanism by ties 46 (FIG. 7) of plastic or other material that will not scratch or damage the stator bar or other means of support known in the art. The actuating mechanism 62 (FIG. 7) positions the translating mechanism 38 (FIG. 7) to move in a radial direction, inward or outward relative to the stator core space. The rotating mechanism 24 is held in place by bolts 60 (FIG. 8) threaded through cutouts 58 (FIG. 8) in the rotating ring segments 52 (FIG. 3) into the bolt holes 59 (FIG. 3) of the end flange 21

Figure 7:
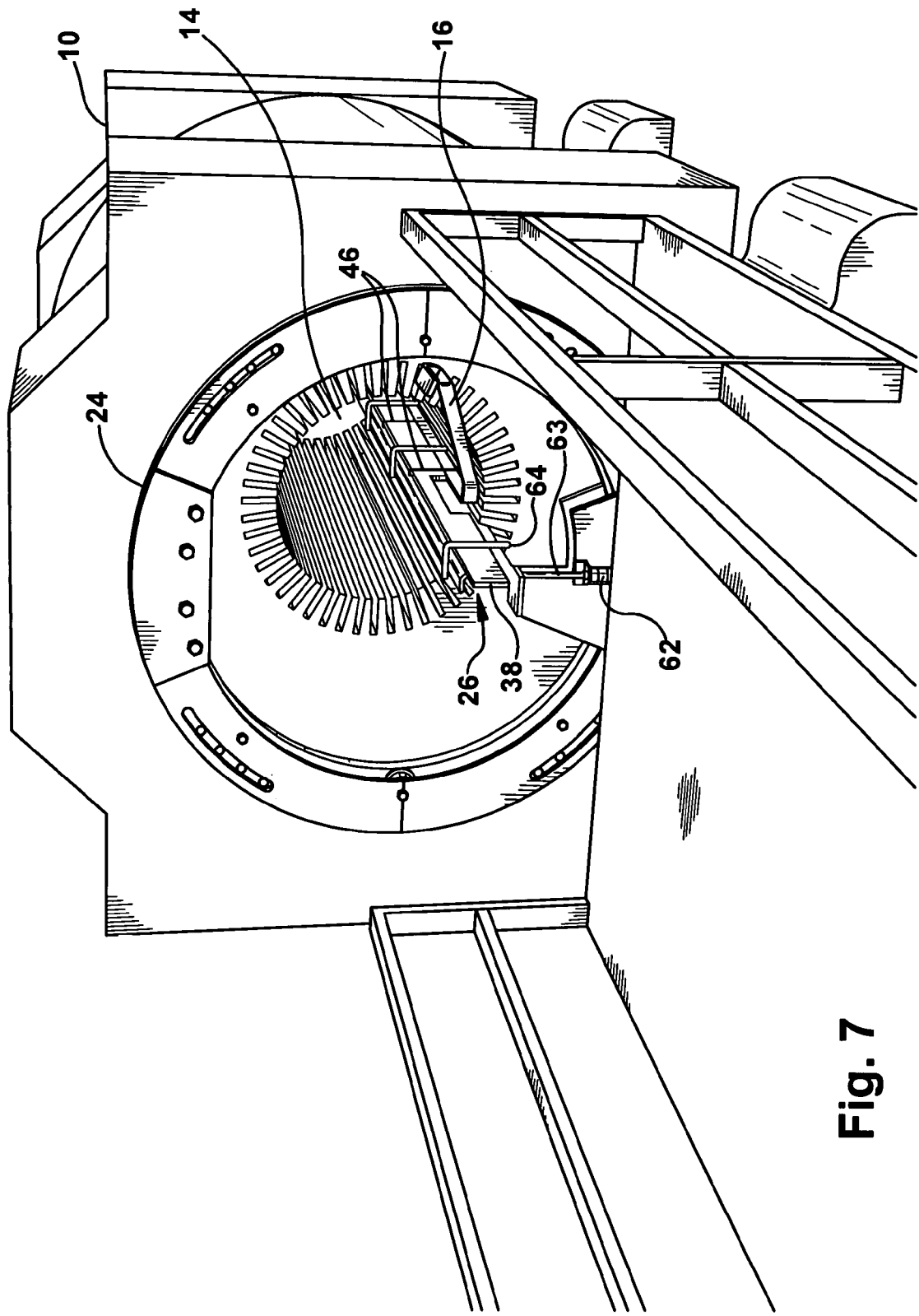
FIG. 7 illustrates the stator bar attached to the stator bar insertion mechanism, according to an aspect of the present invention.

FIG. 7 illustrates the stator bar 16 attached to the stator bar insertion mechanism 26. A plurality of spring-loaded clamps 65 may further be provided to maintain the translating mechanism 38 and stator bar 16 laterally in alignment with the guide plate. The spring-loaded clamps are placed along the length of the translating mechanism 38. The spring-loaded clamps cradle the translating mechanism 38 and the stator bar 16, between a vertical arm 66 and a horizontal arm 68 that mates with the guide plate back-side 32 (FIG. 10A), under spring-tension. With the stator bar 16 held firmly to the stator bar insertion mechanism 26, the rotating mechanism 24 may be rotated, as required, to align the stator bar for insertion into a specific stator core slot.

Figure 8:
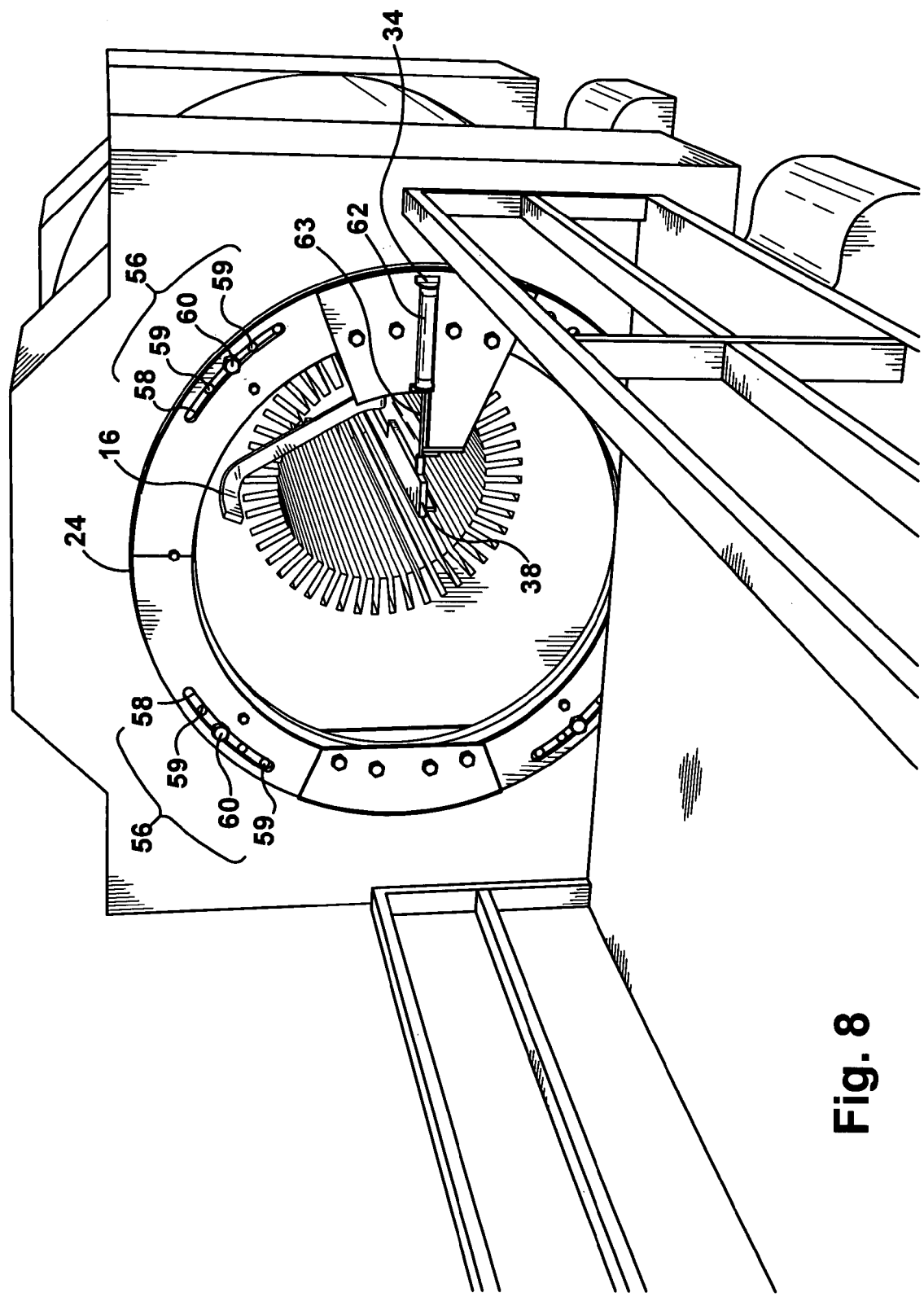
FIG. 8 illustrates the rotating mechanism rotated to an angle such that the support plate holds the stator bar at a 90 degree angle with respect to the vertical diameter stator core volume, according to an aspect of the present invention.

FIG. 8 illustrates the rotating mechanism 24 rotated to an angle such that the support plate 34 holds the stator bar 16 at a 90 degree angle with respect to the vertical diameter of stator core space 14. The rotating mechanism 24 is specifically rotated to align the stator bar 16 with the entrance to a specific stator core slot (not shown) into which the stator bar 16 is to be installed. In preparation for insertion of the stator bar 16 into the stator core slot, the rotating mechanism 24 is locked in place using the braking mechanism 56.

Figure 9:
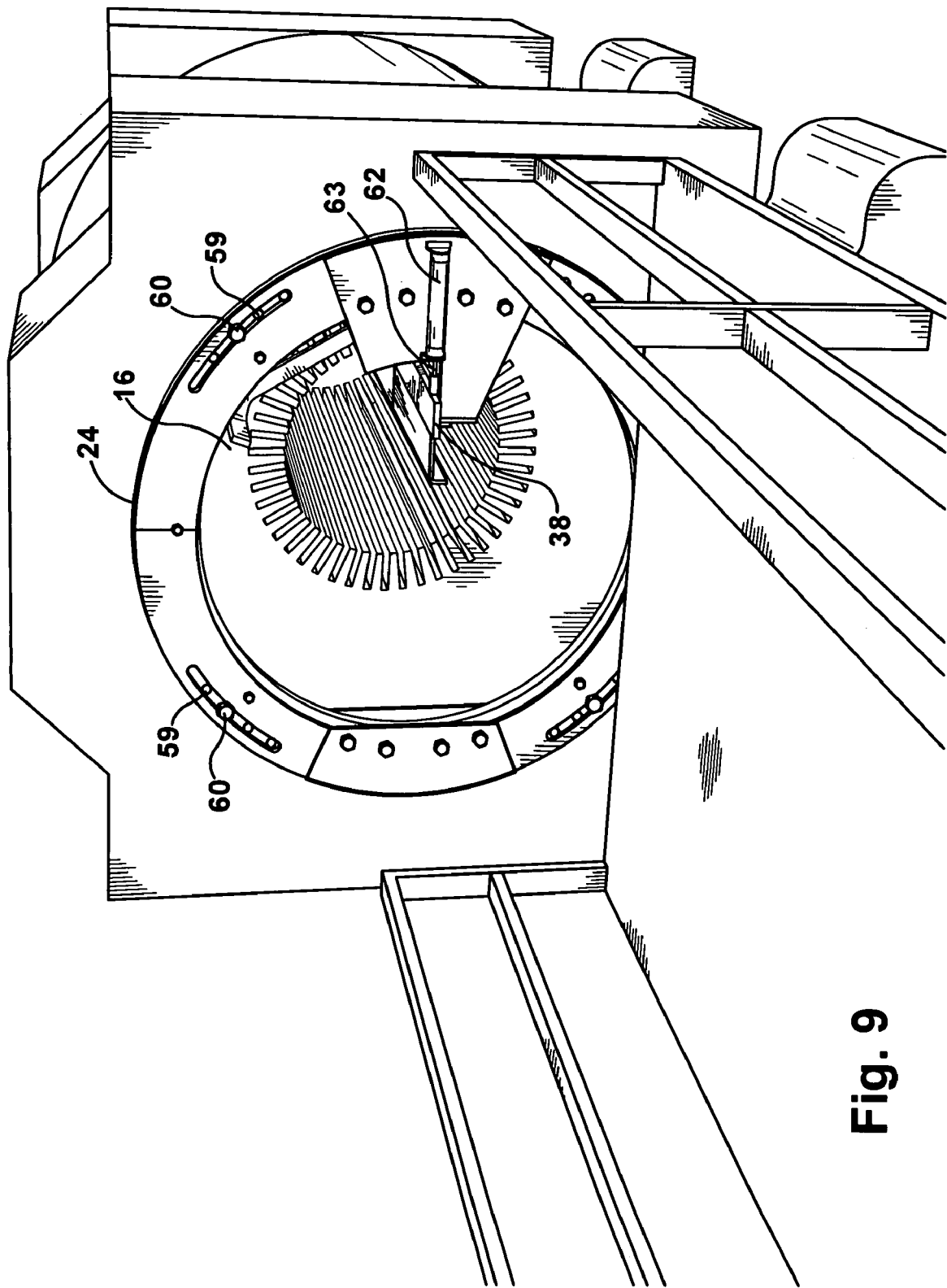
FIG. 9 shows operation of the actuating mechanism retracting the stator bar toward the stator core slot, according to an aspect of the present invention.

FIG. 9 shows operation of the actuating mechanism 62 to retract the control arm 63 to pull the translating mechanism 38, holding the stator bar 16, outward in the radial direction, thereby inserting the stator bar 16 into a stator core slot (not visible).

The rotating mechanism 24 may be similarly positioned to any stator core slot 18 around the circumference of the stator core space 14. According to the first aspect of the present invention, rotation of the stator bar insertion mechanism 26 to any angular position and insertion of a stator bar 16 in any stator core slot 18 does not require breaking down and setting up the stator bar insertion fixture for different stator core slots 18.

FIGS. 10A and 10B show an expanded view of the stator bar installation fixture 20 at the collector end housing 10. Support plates 34, mounted on the inner rotating ring 50 and the outer rotating ring 51, are topped at their innermost radial end by a support plate seat 35. The guide plate 30 is mounted by conventional means on top of the support plate seat 35 such that inboard edges 36 of the support plate 34 will not interfere with the stator bar 16 or translating mechanism 38, as the translating mechanism 38 slides in an outward radial direction along the guide plate 30 for insertion of the stator bar 16 into a stator core slot 18 (typical). The guide plate 30 and the translating mechanism 38 are oriented so the when the stator bar 16 is mounted flush against the translating mechanism 38, the stator bar is oriented radially for insertion into one of the stator core slots 18 to which the rotating mechanism has been indexed. Actuating mechanism 62 is shown mounted to the support plate 34 of the outer rotating ring 51. Control arm 63, extends from the actuating mechanism 62 and is connected to the bottom side of translating mechanism 38 through a flexible coupling 64. Retraction of the control arm 63 into the actuating mechanism 62 pulls the translating mechanism 38 in an outward radial direction. Extension of the control arm 63 from the actuating mechanism 38 pushes the translating mechanism 38 in an outward radial direction. Each of a plurality of vertical cutouts 40 in the translating mechanism 38 mates with an associated guide pin 41 protruding from the translating mechanism 38. The guide pin 41 of the translating mechanism 38 sliding within the vertical cutouts 40 of the guide plate 30 forces the translating mechanism 38 to move only in a radial direction, with respect to the guide plate 30, when acted upon by the control arm 63. The spring-loaded clamps 65 extend along the outer surface of the translating mechanism 38 and over the back-side 39 of the guide plate 30. The spring-loaded clamps 65 may be further repositioned when a stator bar is to be supported, thereby extending along the outer surface of the stator bar (FIG. 7). The tension from spring-loading maintains the translating mechanism 38 and the stator bar 16 in lateral alignment along the guide plate face 31, thereby orienting the stator bar in a radial direction for insertion into a selected stator core slot.

Figure 11A:
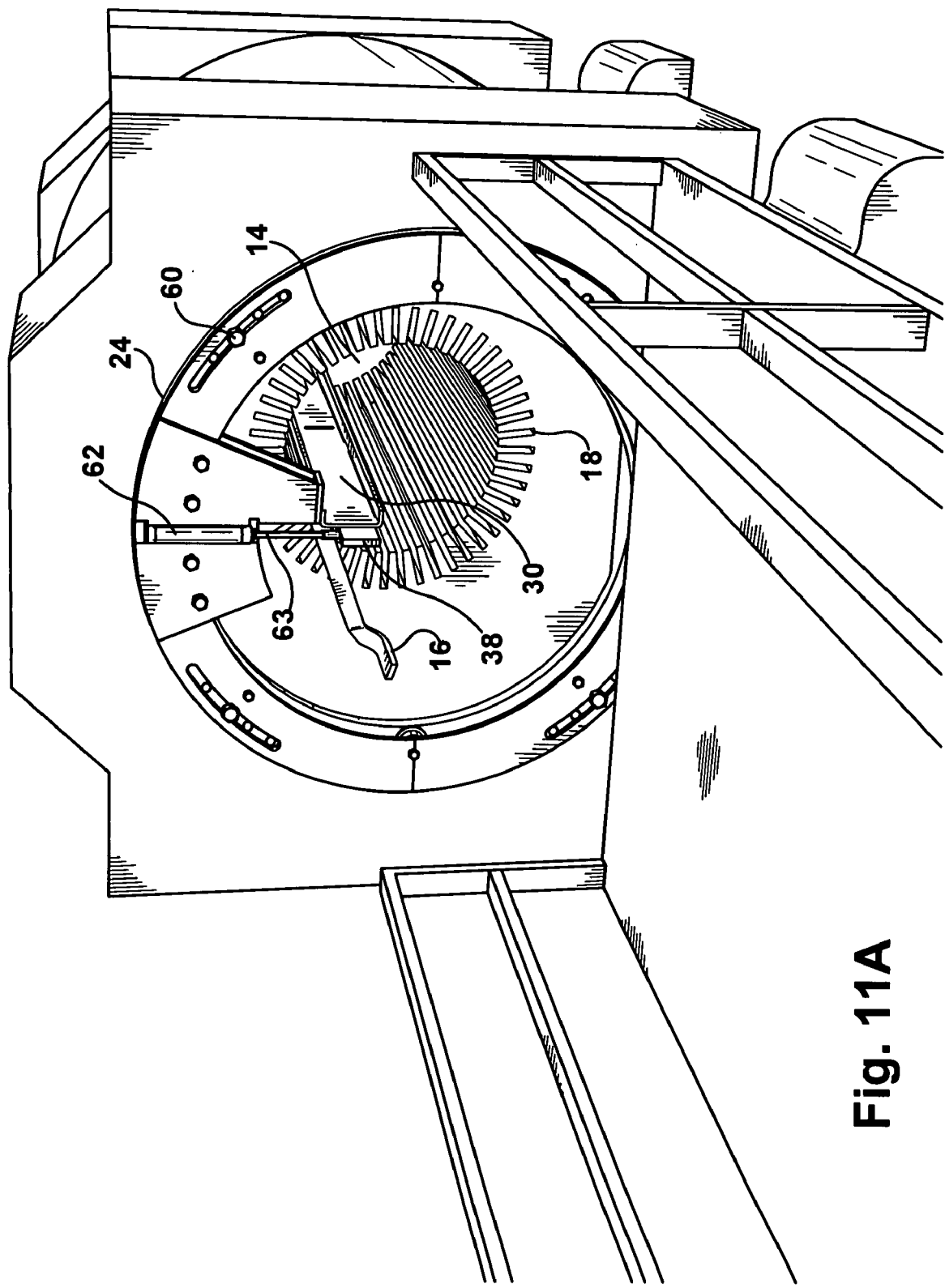
FIGS. 11A thru 11D illustrate the rotating mechanism rotated to different angular positions and different translation depths while supporting a stator bar, according to an aspect of the present invention.
Figure 11B:
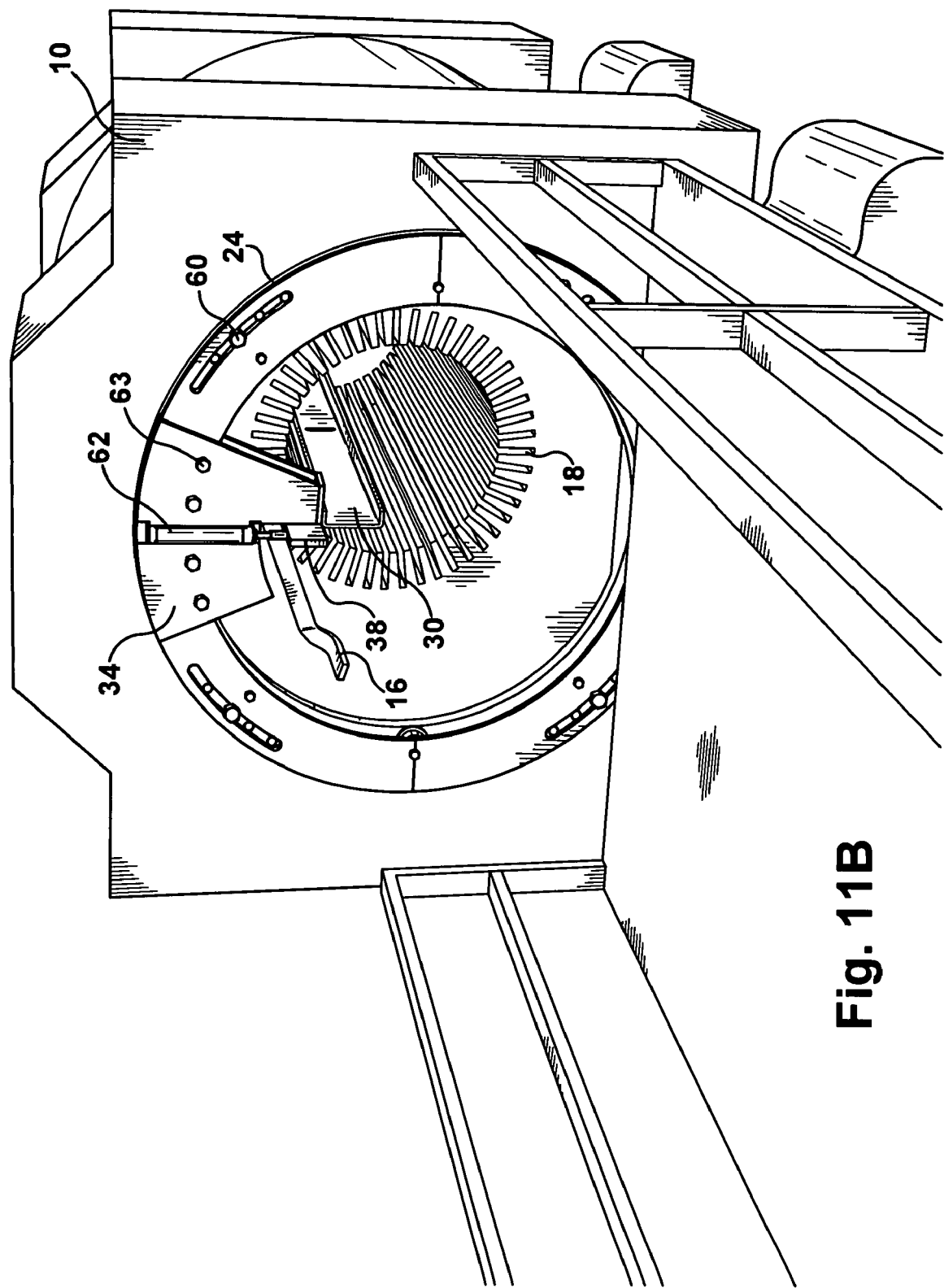
Figure 11C:
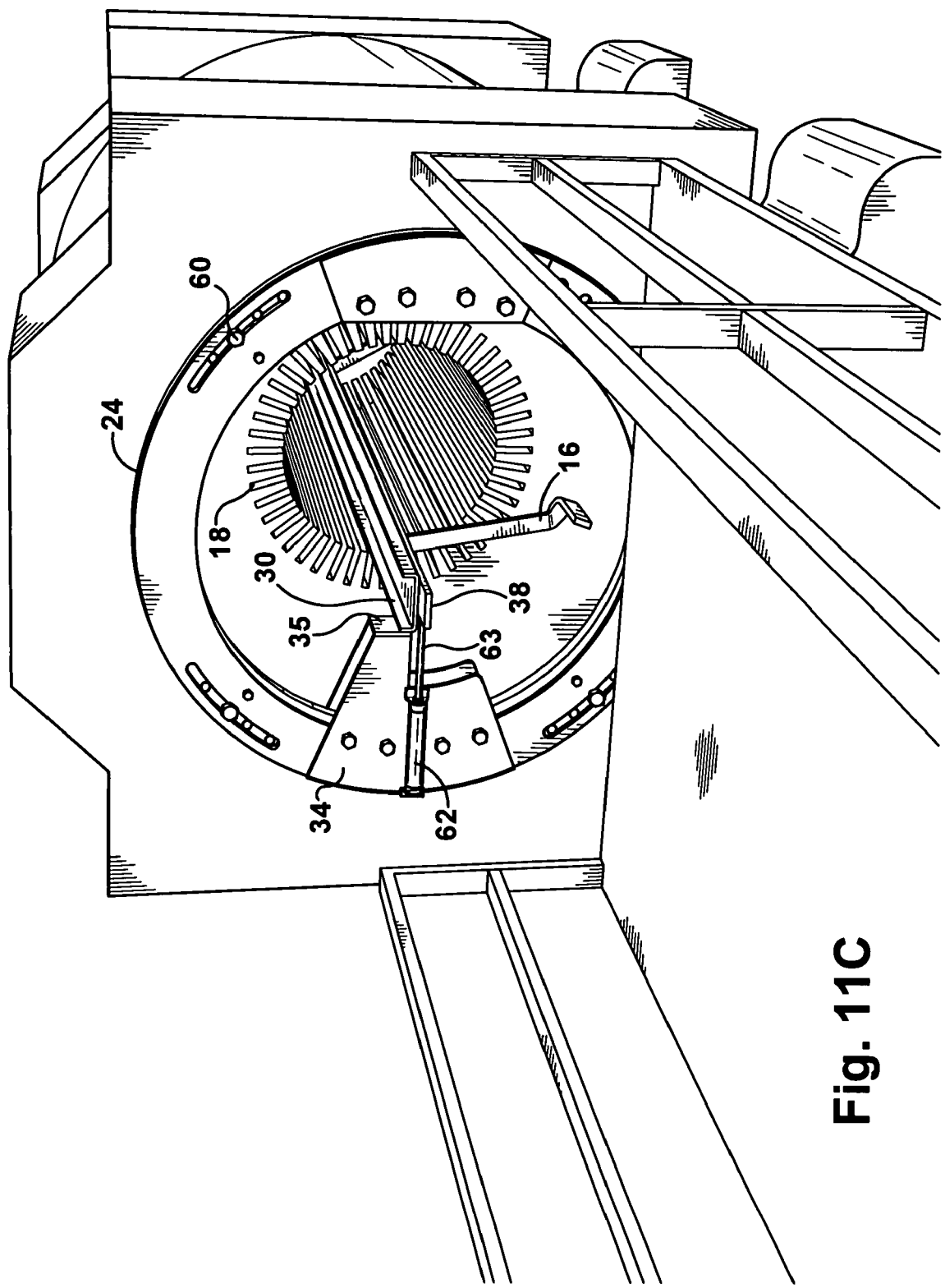
Figure 11D:
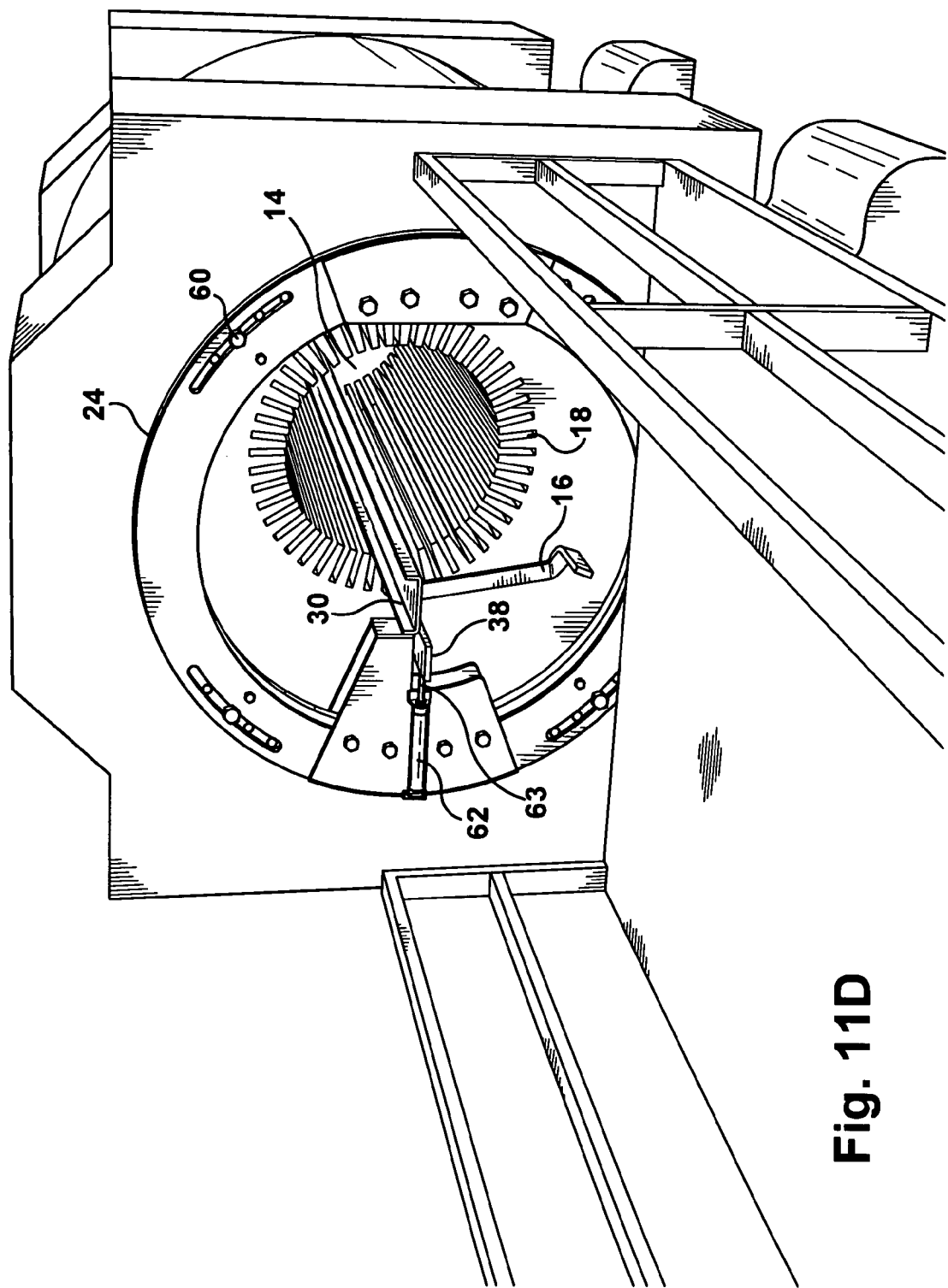

FIGS. 11A, 11B, 11C and 11D illustrate the rotating mechanism rotated to different angular positions with respect to the stator core space 14 while supporting a stator bar 16 on the translating mechanism 38. FIGS. 11A and 11B show the stator bar 16 rotated to 180 degrees from the bottom of the stator core space. FIG. 11A shows the control arm 63 for the actuating mechanism 62 in a fully extended position with the stator bar 16 spaced apart from the stator core slots. FIG. 11B shows the control arm 63 in a retracted position with the stator bar 16 positioned toward the stator core slot 18. FIGS. 11C and 11D similarly show the stator bar spaced from the stator core slot 18 and positioned adjacent to the stator core slot respectively, and rotated 270 degrees from the bottom of the stator core space 14. Also shown is the bolt 60 screwed into the bolting hole 59 through cutout 58 in a plurality of rotating ring segments 52 to lock the rotating mechanism 24 at the desired angular rotation.

In a second aspect of a stator bar installation fixture, each rotating mechanism includes an adapter track and a rotating ring mounted at each end of the generating equipment. The track may be mounted by bolting onto a suitable surface of the end frame of the rotating electrical equipment, including but not limited to the end flange. The adapter track is an annular-shaped structure whose inner diameter is sufficiently large to accommodate access to the vacated rotor space for the stator bar insertion mechanism. The adapter track may be arranged in segments of track plates to facilitate lifting and installation. The track plates may be provided with a plurality of bolting holes of appropriate location and size to accommodate a variety of known bolting patterns for different electrical generators. The inner diameter of the adapter track provides a continuous circular surface. The rotating ring is situated outboard of the adapter track. The rotating ring includes a plurality of main rollers, located circumferentially around its inboard surface, which ride on the inner diameter surface of the adapter track. The main rollers provide support for and allow rotation of the rotating ring on the adapter track. Like the adapter track, the rotating ring is annular-shaped with an inner diameter that allows access to the volume of the stator core. The rotating ring also includes one set of guide rollers to provide separation between the inner surface of the rotating ring and the outer surface of the adapter track, thereby allowing smooth rotation of the rotating ring. Another set of guide rollers on the rotating ring mate with the inboard surface of the adapter track to prevent the rotating ring from separating too far axially from the adapter track. Also in this aspect of the stator bar installation fixture, a guide plate is reinforced with a truss section.

Figure 12:
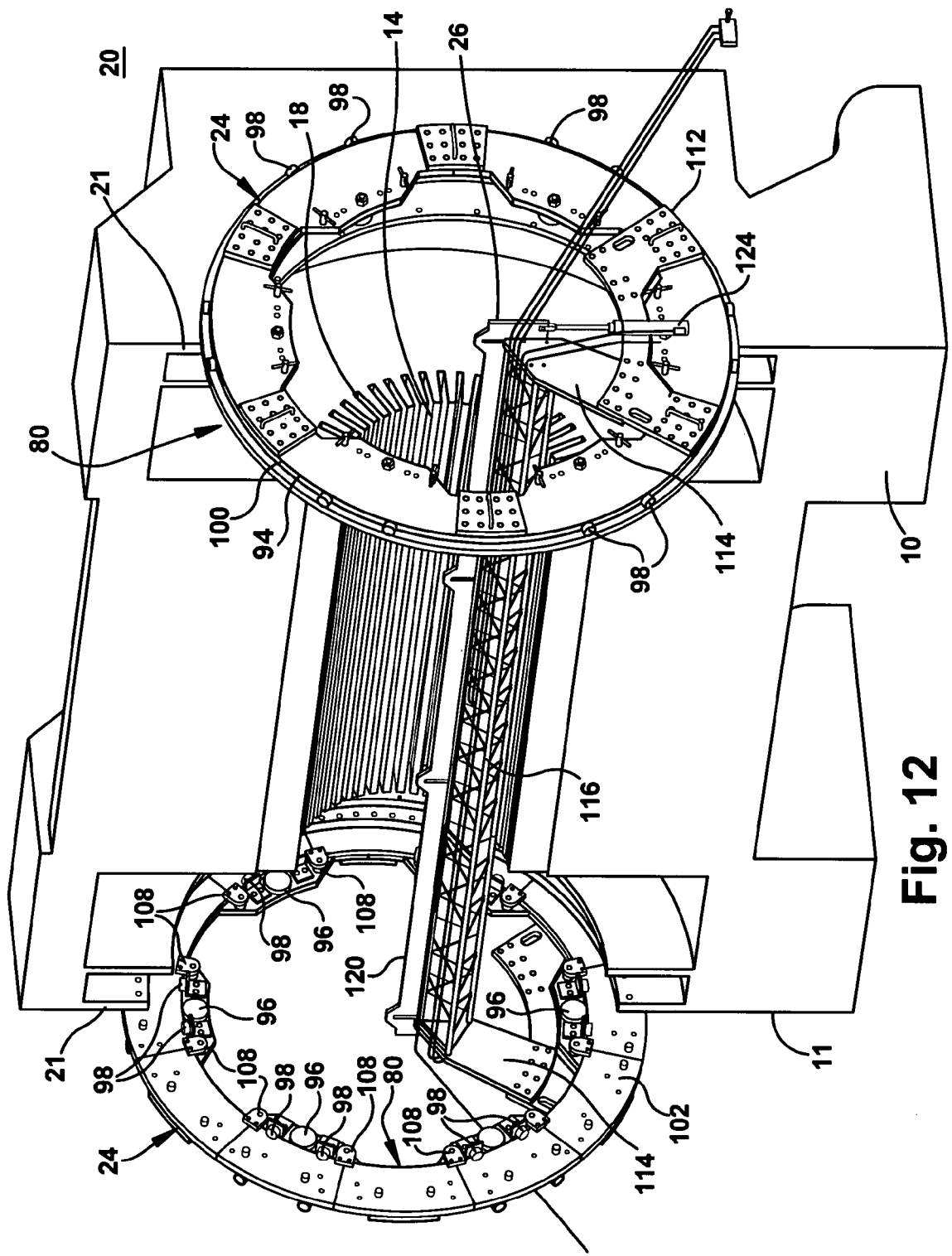
FIG. 12 illustrates a cutaway view of an electrical generator frame along an axial direction with the stator bar installation mechanism installed, according to a second aspect of the present invention.

FIG. 12 illustrates a cutaway view of an electrical generator frame along an axial direction with a stator bar installation fixture 20 installed according to a second aspect of the present invention. Exposed is the stator core space 14, typical stator core slots 18 around the periphery of the stator core space 14, the rotating mechanism 24 at each end of the electrical generator frame (10 and 11), the adapter track 80 and the stator bar insertion mechanism 26 mounted at each end to the rotating mechanisms 24.

One adapter track 80 is mounted on the end flange 21 on the turbine end housing 11 and a second adapter track 80 (not shown) is mounted on the end flange (not shown) on the collector end housing 10. One rotating ring 94 is mounted to adapter track 80 on the collector end housing 10 and a second rotating ring 94 is mounted to the adapter track 80 on the turbine end housing 11. Separation between the adapter track 80 and the rotating ring is maintained by guide rollers 98, where the guide rollers 98 may be distributed uniformly around the circumference of rotating rings 94. The stator bar insertion mechanism 26 is supported, at each end, within the stator core space 14 by gusset plate extensions 114, which are mounted to the respective rotating ring 94 by gusset plates 112.

Figure 13:
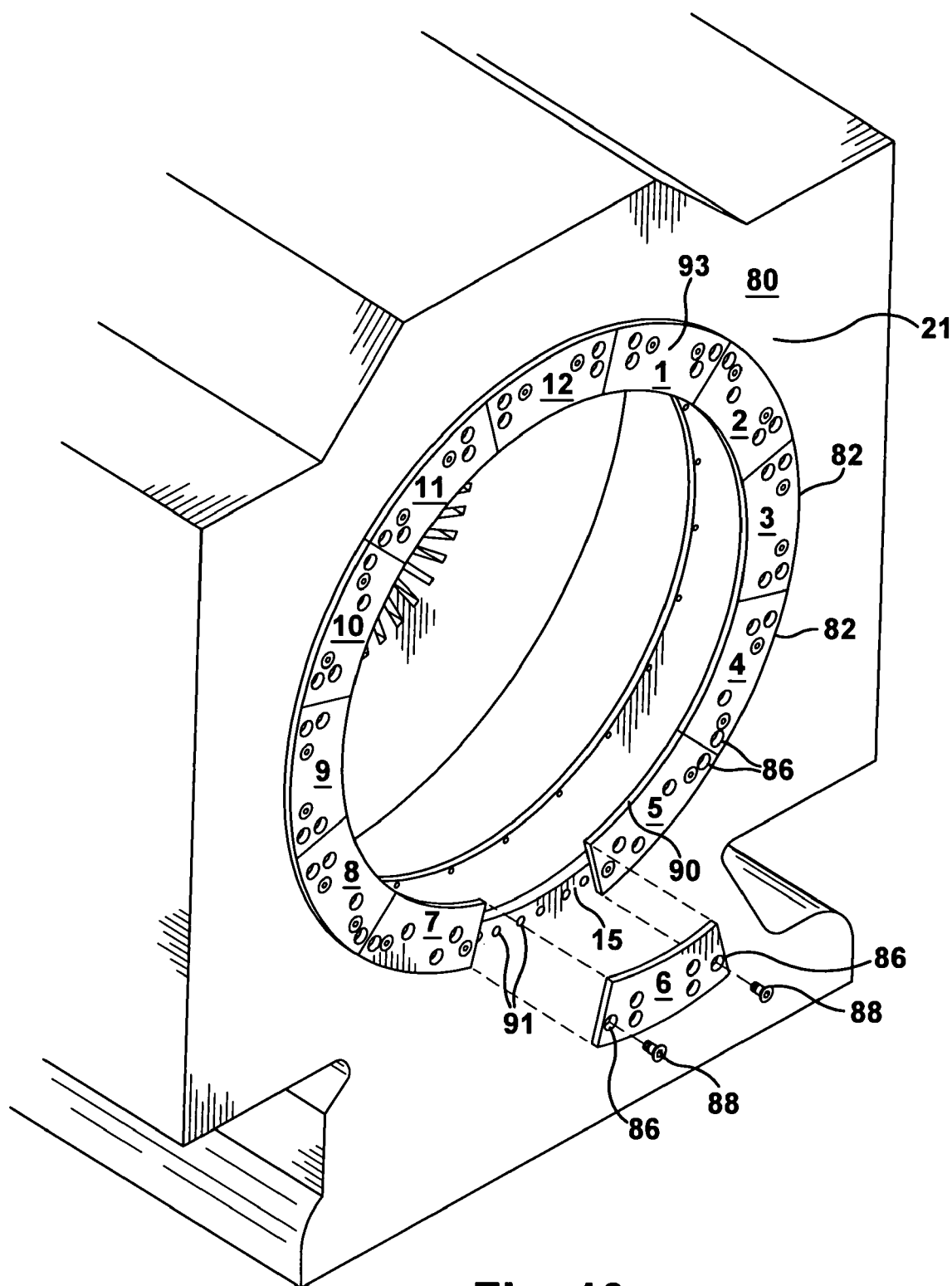
FIG. 13 illustrates an adapter track installed by bolting to the existing bolt holes at each generator end flange, according to a second aspect of the present invention.

FIG. 13 illustrates an adapter track 80 installed by bolting to the existing bolt holes 91 at each generator end flange 21. The adapter track 80 is arranged in track plate segments 82. Track plate segments 82 are provided with bolt hole cutouts 86 located to accommodate a plurality of bolting hole patterns on the generator end flange 21. Bolts 88 are sized to the accommodate the bolt holes 91 for a specific bolting surface 15 of generator end flange 21. The inner diameter surface 90 of the track 80 forms the support surface for rotation of the rotating mechanism (not shown).

Figure 14B:
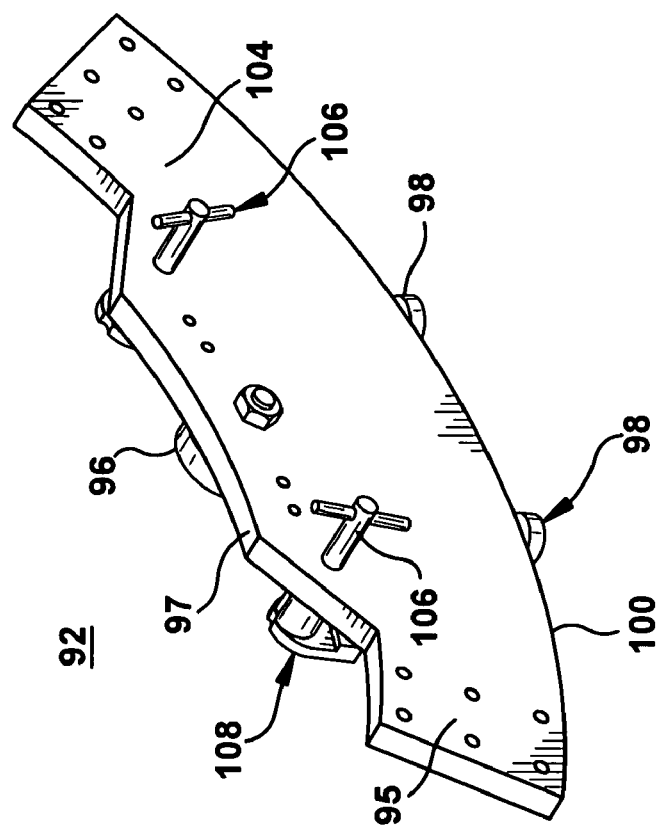
FIGS. 14A-14B illustrate rotating ring segments that are assembled to form a single rotating ring, according to a second aspect of the present invention.
Figure 14A:
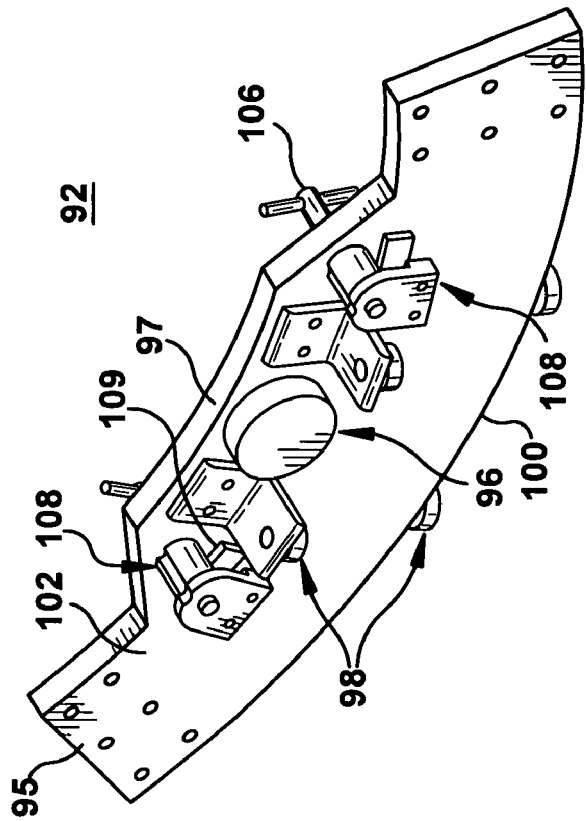
Figure 15A:
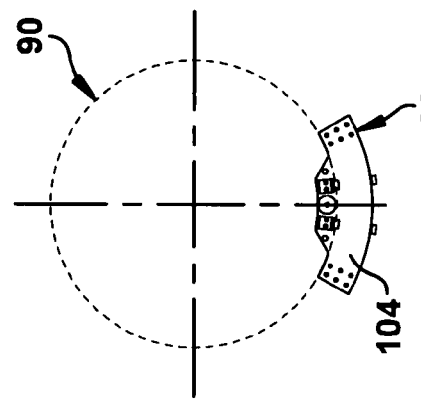
FIGS. 15A-15F illustrate the sequence of installation for the rotating ring segments into the rotating ring, according to a second aspect of the present invention.
Figure 15B:
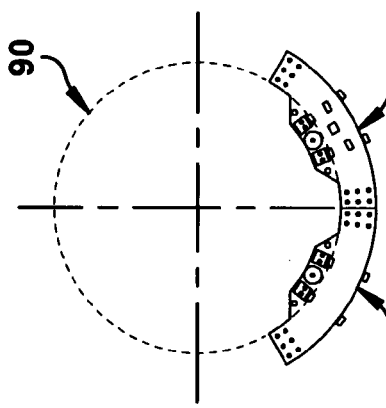
Figure 15C:
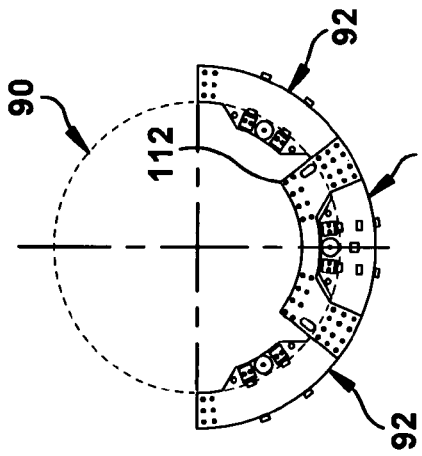
Figure 15D:
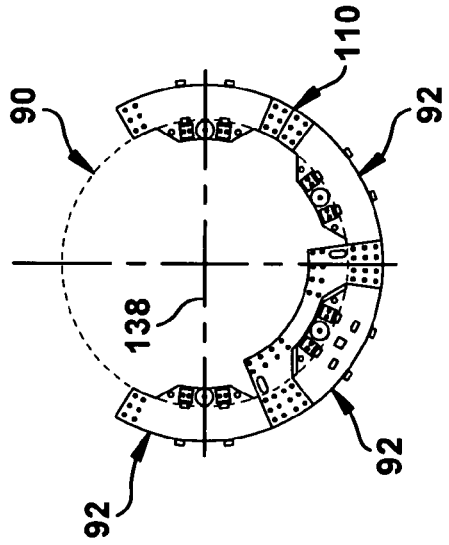
Figure 15E:
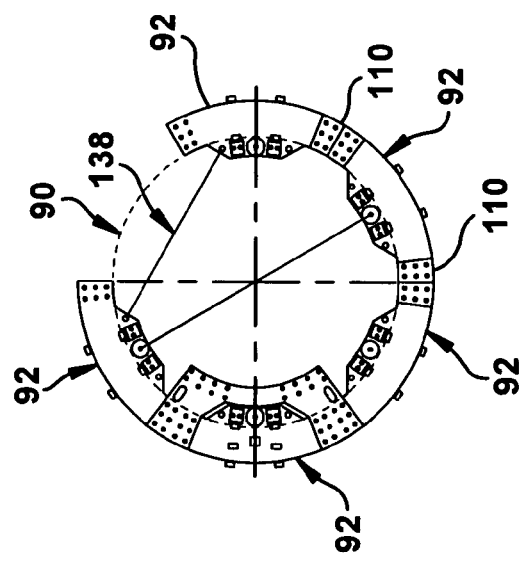
Figure 15F:
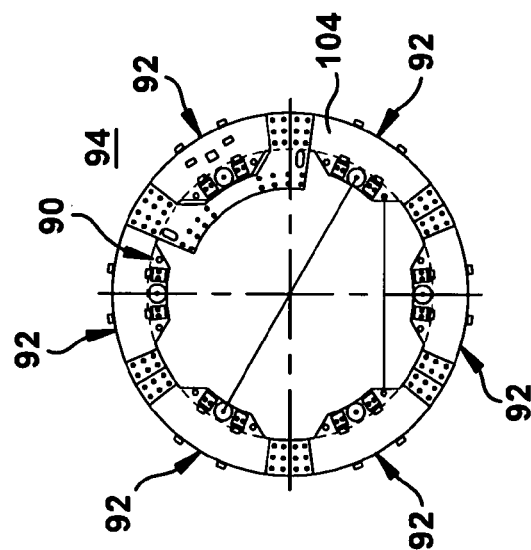

FIGS. 14A-14B illustrate rotating ring segments 92 that may be assembled to form a single rotating ring 94 (FIG. 15F). The rotating ring segments 92 are of a flat plate-shape conformed to be of a generally annular segment for individual placement on the adapter track 80. Each rotating ring segment 92 includes bolting patterns 95 at each circumferential end for connecting with adjacent rotating ring segments 92 to form the rotating ring 94. One main roller 96 is mounted normal to and rotatingly on the inboard surface 102 of each rotating ring segment 92. The main roller 96 extends radially inward beyond the inner edge 97 of the rotating ring segment 92 such that the main roller 96 engages and rides on the adapter track, supporting the weight of the rotating ring segment 92. A plurality of guide rollers 98 are mounted rotatingly with a radial axis around the outer diameter surface 100 of the rotating ring segments 92 to ride on the outboard surface 93 of the adapter track, thereby maintaining a predetermined separation between the inboard surface 102 of the rotating ring segments 92 and the outboard surface 93 of the adapter track 80 (FIG. 12). A further plurality of guide rollers 98 are rotatingly mounted on the inboard surface 102 of the rotating ring segments 92 to ride on the inboard surface 95 of the adapter track 80, thereby maintaining axial proximity between the rotating ring 94 and the adapter track 80.

A plurality of locking tee nuts 106 may be provided on the outboard surface 104 of the rotating ring segment 92. Rotation by hand of the locking tee nuts 106 squeezes a braking assembly 108 into contact with the adapter track 80 in the manner of calipers providing a braking action to hold the individual rotating ring segment 92 in place during installation on the adapter track 80 or for holding the assembled rotating ring 94 in place while a stator bar is being placed into a stator core slot. Referring again to FIG. 12, for details of the main rollers 96 riding on the adapter track inner diameter surface 90 of the adapter track 80. An inner pad caliper 109 of the brake assembly 108 is shown riding on the inboard surface 102 of the adapter track 80.

FIGS. 15A-15F illustrate the sequence of installation for the rotating ring segments 92 onto the adapter track to form the rotating ring. The first individual rotating ring segment is fitted over the inner diameter surface 90 of the adapter track 80 and then rotated to allow placement of the next rotating ring segment 92. The individual rotating ring segments 92 may be attached together with splice plates 110. Previously installed rotating ring segments 92 may be supported by struts 138 while later rotating ring segments are installed.

Figure 16A:
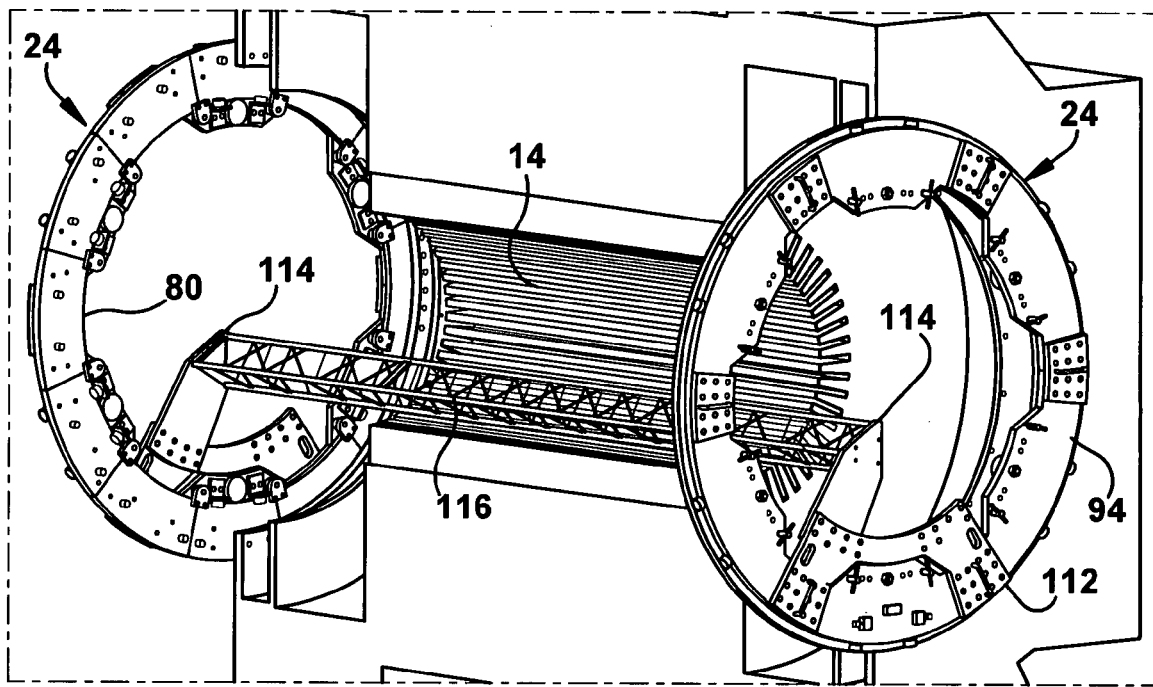
FIGS. 16A-16B illustrate assembled rotating rings supporting a translating mechanism.
Figure 16B:
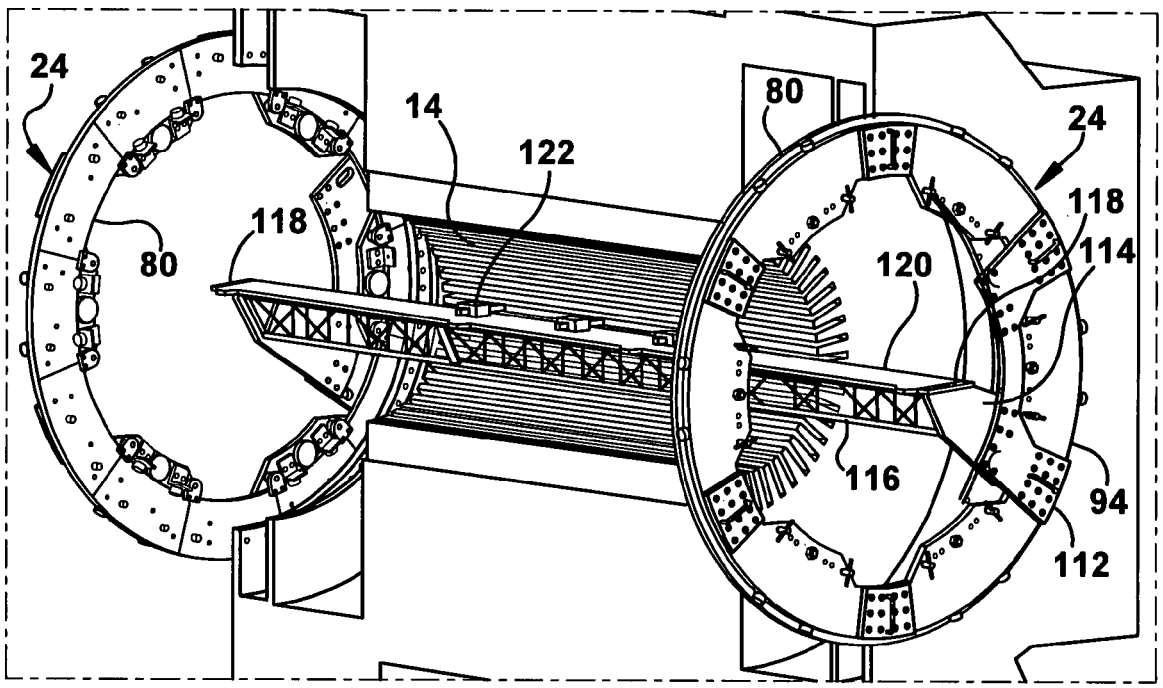

FIG. 16A-16B illustrates assembled rotating ring supporting a translating mechanism. A gusset plate 112 is mounted to the segment rings 92 (FIG. 14). A gusset plate extension 114 may be mounted to the gusset plate by conventional means in one of two positions. The gusset plate extension 114 on the rotating ring 94 at each end of the electrical generator supports the stator bar insertion mechanism 26. One position aligns the guide plate 118 for placement of the stator bar in a stator core slot in the lower half of the stator core space and the other position aligns the guide plate for placement of the stator bar in a stator core slot in the upper half of the stator core space.

Referring to FIGS. 12, 16A and 16B, details of the stator bar insertion mechanism 26 are shown. The truss section 116 of aluminum or other lightweight, but strong material, is bolted at its ends to the gusset plate extension 114 at each end of the electrical generator. The guide plate 118 is mounted to the truss section 116. The guide plate 118 provides a smooth surface along which the translating mechanism 120 slides. The guide plate 118 may be fiber reinforced. A plurality of guide bar mechanisms 122 maintain the translating mechanism 120 at a fixed horizontal alignment with the guide plate 118 as the translating mechanism 120 slides up and down with respect to the guide plate 118.

Figure 17:
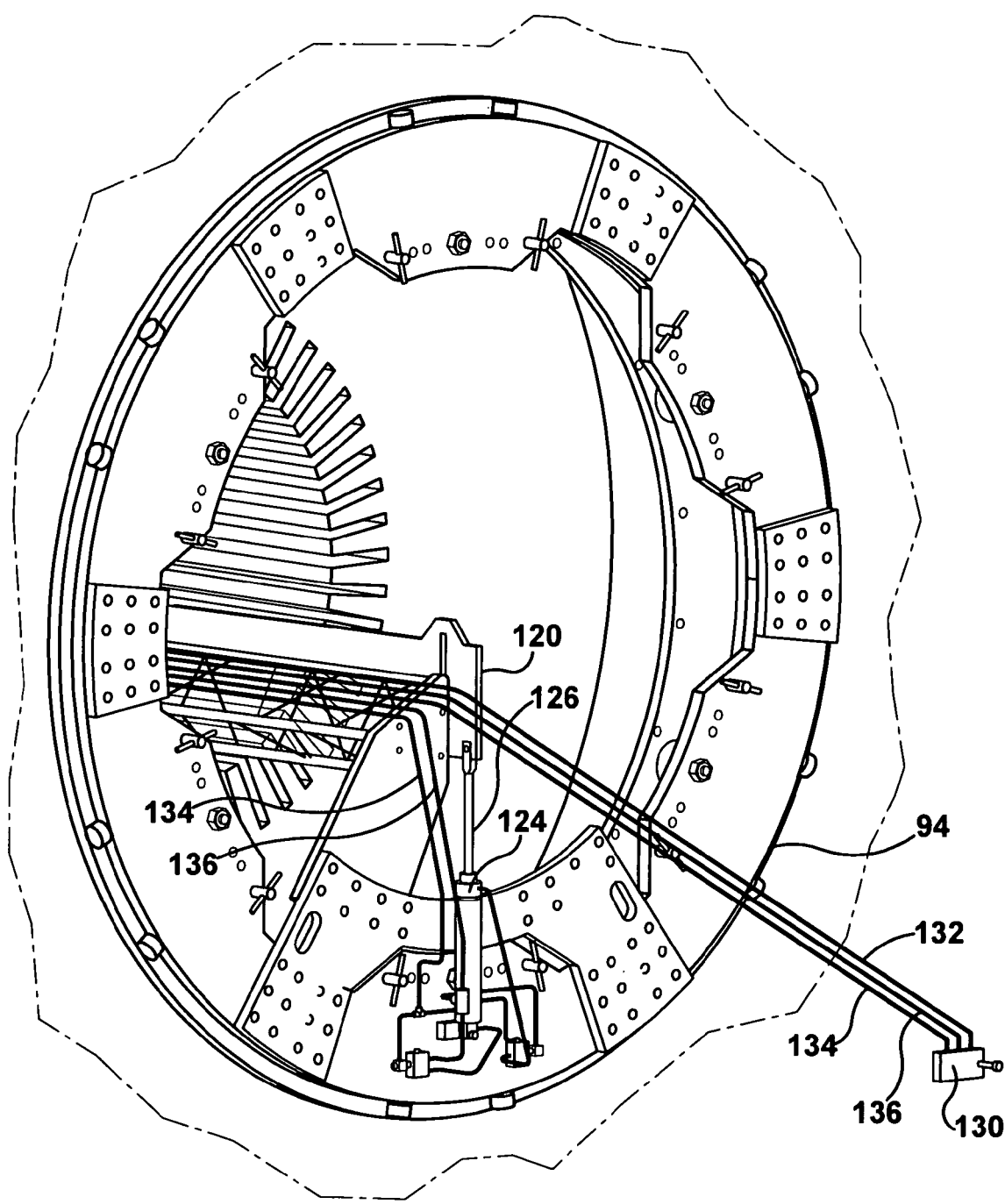
FIG. 17 illustrates a pneumatic control system for extension and retraction of the control arm acting on translating mechanism, according to a second aspect of the present invention.

FIG. 17 illustrates a pneumatic control system for extension and retraction of the control arm acting on translating mechanism. A double acting pneumatic control cylinder 124, mounted on rotating ring 94, is connected to translating mechanism 120 through control arm 126. A regulated air supply (Not shown) of suitable pressure and quality is provided to the system. Air supplied to one side of the control cylinder 124 causes the control arm 126 to retract. Air supplied to the other side of the control cylinder 124 causes the control arm 126 to extend. Retraction of the control arm 126 moves the translating mechanism 120 and the stator bar (if mounted) in an outward radial direction for insertion into a stator core slot. Extension of the control arm 126 moves the translating mechanism 120 and the stator bar (if mounted) in an inward radial direction for removal from a stator core slot. Operating controls for a pneumatic system, such as hand lever valve 130 direct an air supply (not shown) through supply tubing 132 and extend tubing 134 or retract tubing 136 to the control cylinder 124. Such controls are well known in the art and need not be further described. A control cylinder 124 and control arm 126 is provided at both the collector and turbine ends of the electrical generator. While pneumatic controls are shown, control for operation of the translating mechanism 120 is not limited to pneumatic control and may include hydraulic, electrical or other control methods known in the art.

In another embodiment of the present invention, a method is provided for inserting and removing the stator bars. The stator bar installation fixture is first installed in the space within the rotating electrical equipment, occupied during operation by the rotor, but available prior to the installation of the rotor or after the rotor has been removed for a maintenance operation. The rotating mechanism is installed at each end of the rotating equipment. In one aspect of the present invention, the rotating mechanism includes two annular rings, roller units and a support plate. The annular rings may be formed by a plurality of annular segments for ease of installation and weight reduction. A segment of the first annular ring is installed inboard of the inner circular surface and attached to corresponding annular segments that are sequentially installed on the inner circular surface of the end flange or other suitable surface. According to the second aspect of the present invention an adapter track is installed by bolting track plates to the bolting surface of each end flange to provide a circular surface on which a rotating ring may rotate. A single rotating ring, which may be comprised of segments, is then installed to ride on the adapter track, as shown in FIGS. 15A-15F.

In either aspect of the present invention, the stator bar insertion mechanism is attached to a support plate on the rotating mechanism at each end of the rotating electrical equipment while the rotating mechanism locates the support plates at the bottom of the stator core space. The rotating mechanism is then rotated 180 degrees from the bottom of the stator core space so the stator bar insertion mechanism and support plates are at the top of the stator core space and will not interfere with bringing a stator bar into the stator core space from a staging area. The stator bar is then manually placed at the bottom of the stator core space, by inserting from the collector end and through to the turbine end. The rotating mechanism is then rotated so the stator bar insertion mechanism is located at the bottom of the stator core volume and positioned above the stator bar. The stator bar is then oriented in an outward radial direction with respect to the translating mechanism (that is in an orientation such that it would slide into a stator core slot when the translating mechanism moves in an outward radial direction). The stator bar may be attached to the translating mechanism using plastic ties or other strapping that will not damage or score the stator bar.

When the stator bar is attached to the translating mechanism, the rotating mechanism is rotated to an angle to align the mounted stator bar angularly with respect to the opening of the specific stator core slot into which the stator bar is to be inserted. The rotating mechanism may be locked in place with an installed braking mechanism when it has been rotated to the desired angular orientation. According to the first aspect of the present invention, the rotating mechanism may be rotated to any angle around the full inner periphery of the stator core for placement of the mounted stator bar into any stator core slot without the need to disassemble and reassemble the stator bar installation fixture.

The stator bar is inserted into the opening of the stator core slot by moving the translating mechanism in the outward radial direction, thereby moving the attached stator bar outward radially toward the stator core slot opening and finally into the stator core slot.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A stator bar installation fixture for installing stator bars into specific stator core slots within a stator core of rotating electrical equipment, the fixture comprising:
   rotating mechanisms, one rotatingly fixed at each end of the rotating electrical equipment, for supporting and controlling an angular positioning of a stator bar insertion mechanism relative to the stator core; and
   a stator bar insertion mechanism for supporting a stator bar within the stator core, the stator bar insertion mechanism adapted to angularly locate a stator bar in alignment with the specific stator core slot and insert the stator bar into the specific stator core slot.

2. The stator bar installation fixture according to claim 1, wherein the stator bar insertion mechanism comprises:
   a translating mechanism;
   a guide plate, fixed on its ends between each of the rotating mechanisms and rotating in synchronism with the rotating mechanism, for supporting and angularly positioning the translating mechanism used to insert stator bars within the stator core; and
   the translating mechanism, slidingly attached to the guide plate, for supporting the stator bar and for inserting and securing the stator bar into the specific slot by translating up and down on the guide plate when the guide plate has been rotated to locate the stator bar at an angular position at the opening of the specific stator core slot.

3. The stator bar installation fixture according to claim 1, wherein the rotating mechanisms are supported by an inner circular surface and allowed to rotate by riding on an inner circular surface of an end flange at each end of the rotating electrical equipment.

4. The stator bar installation fixture according to claim 3, wherein each of the rotating mechanisms further comprises a plurality of rollers units providing support for the rotating mechanism and riding on the inner circular surface of the rotating electrical equipment.

5. The stator bar installation fixture according to claim 1, where each of the rotating mechanisms further comprises:
   two rotating rings, including an inner rotating ring located inboard of the end flange and an outer rotating ring located outboard of the end flange;
   roller units riding on the inner circular surface of the end flange, the roller units separating the inner rotating ring and the outer rotating ring at a fixed distance and preventing contact between the inner rotating ring, the outer rotating ring and the end flange; and
   a support plate, projecting inward radially from each of the rotating mechanisms and attaching the respective end of the stator bar insertion mechanism to the rotating mechanism.

6. The stator bar installation fixture according to claim 5, wherein each rotating ring is divided into segments of an annulus to facilitate lifting and installation.

7. The stator bar installation fixture according to claim 5, wherein the stator bar installation fixture is adaptable to rotating electrical equipment with varying stator core diameters by providing support plates of varying inward radial projection, thereby providing adjustability for the radial positioning of the stator bar insertion mechanism proximate to the inner periphery of the stator core.

8. The stator bar installation fixture according to claim 5, wherein the rotating mechanism is adaptable to rotating electrical equipment with varying stator core diameters by a telescoping mechanism permitting segments of the rotating mechanism to establish varying inner diameters and radial positioning of the stator bar insertion mechanism proximate to the inner periphery of the stator core.

9. The stator bar installation fixture according to claim 4, the fixture being adaptable to varying stator bar lengths by providing the stator bar insertion mechanism sized to the axial length of the stator core.

10. The stator bar installation fixture according to claim 1, further comprising an adapter track attachably fixed at each end of the rotating electrical equipment for mounting the rotating mechanism at the respective end of the rotating electrical equipment.

11. The stator bar installation fixture according to claim 1 wherein the fixture is capable of inserting stator bars around the full periphery of the stator core annulus without disassembly and reassembly of the fixture.

12. The stator bar installation fixture according to claim 1, further comprising:

braking means for locking the rotating mechanism in place when the rotating mechanisms have been rotated to an angular position for inserting the stator bar into the specific stator core slot; and actuating means for controlling the position of the stator bar on the stator insertion mechanism for inserting the stator bar into the specific stator core slot and removing the stator bar from the specific stator core slot.

13. A stator bar installation fixture comprising:

adapter tracks, one adapter track attachably fixed at each end of a rotating electrical equipment:

rotating rings, one mounted rotatingly to each adapter track;

a plurality of roller units, mounted on each rotating ring and adapted to support the rotating ring and allow the rotating ring to rotate on an inner circular surface of the respective adapter track;

a stator bar insertion mechanism, supported at each end along an axial direction of the stator core space from the respective rotating ring and adapted to positioning a stator bar within the stator core space, the mechanism further including a guide plate, a support truss and a translating mechanism.

* * * * *